US011113860B2

United States Patent
Rigiroli et al.

(10) Patent No.: US 11,113,860 B2
(45) Date of Patent: *Sep. 7, 2021

(54) PARTICLE-BASED INVERSE KINEMATIC RENDERING SYSTEM

(71) Applicant: Electronic Arts Inc., Redwood City, CA (US)

(72) Inventors: Paolo Rigiroli, Vancouver (CA); Hitoshi Nishimura, Burnaby (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,645

(22) Filed: Jan. 13, 2020

(65) Prior Publication Data
US 2020/0294299 A1 Sep. 17, 2020

Related U.S. Application Data

(63) Continuation of application No. 15/705,168, filed on Sep. 14, 2017, now Pat. No. 10,535,174.

(51) Int. Cl.
*G06T 13/40* (2011.01)
*G06N 3/04* (2006.01)
*A63F 13/52* (2014.01)

(52) U.S. Cl.
CPC .............. *G06T 13/40* (2013.01); *A63F 13/52* (2014.09); *G06N 3/04* (2013.01); *G06T 2213/12* (2013.01)

(58) Field of Classification Search
None
See application file for complete search history.

(56) References Cited

U.S. PATENT DOCUMENTS 5,274,801 A  12/1993 Gordon
5,548,798 A   8/1996 King
(Continued)

FOREIGN PATENT DOCUMENTS

CN   102509272 A   6/2012
CN   103546736 A   1/2014
(Continued)

OTHER PUBLICATIONS

Anagnostopoulos et al., "Intelligent modification for the daltonization process", International Conference on Computer Vision Published in 2007 by Applied Computer Science Group of digitized paintings.
(Continued)

*Primary Examiner* — Yanna Wu
(74) *Attorney, Agent, or Firm* — Knobbe, Martens, Olson & Bear, LLP

(57) ABSTRACT

The present disclosure provides embodiments of a particle-based inverse kinematic analysis system. The inverse kinematic system can utilize a neural network, also referred to as a deep neural network, which utilizes machine learning processes in order to create poses that are more life-like and realistic. The system can generate prediction models using motion capture data. The motion capture data can be aggregated and analyzed in order to train the neural network. The neural network can determine rules and constraints that govern how joints and connectors of a character model move in order to create realistic motion of the character model within the game application.

20 Claims, 14 Drawing Sheets

(56) References Cited

U.S. PATENT DOCUMENTS

| | | |
|---|---|---|
| 5,982,389 A | 11/1999 | Guenter et al. |
| 5,999,195 A | 12/1999 | Santangeli |
| 6,064,808 A | 5/2000 | Kapur et al. |
| 6,088,040 A | 7/2000 | Oda et al. |
| 6,253,193 B1 | 6/2001 | Ginter et al. |
| 6,556,196 B1 | 4/2003 | Blanz et al. |
| 6,961,060 B1 | 11/2005 | Mochizuki et al. |
| 7,006,090 B2 | 2/2006 | Mittring |
| 7,403,202 B1 | 7/2008 | Nash |
| 7,415,152 B2 | 8/2008 | Jiang et al. |
| 7,944,449 B2 | 5/2011 | Petrovic et al. |
| 8,100,770 B2 | 1/2012 | Yamazaki et al. |
| 8,142,282 B2 | 3/2012 | Canessa et al. |
| 8,154,544 B1 | 4/2012 | Cameron et al. |
| 8,207,971 B1 | 6/2012 | Koperwas et al. |
| 8,267,764 B1 | 9/2012 | Aoki et al. |
| 8,281,281 B1 | 10/2012 | Smyrl et al. |
| 8,395,626 B2 | 3/2013 | Millman |
| 8,398,476 B1 | 3/2013 | Sidhu et al. |
| 8,406,528 B1 | 3/2013 | Hatwich |
| 8,540,560 B2 | 9/2013 | Crowley et al. |
| 8,599,206 B2 | 12/2013 | Hodgins et al. |
| 8,624,904 B1 | 1/2014 | Koperwas et al. |
| 8,648,863 B1 | 2/2014 | Anderson et al. |
| 8,860,732 B2 | 10/2014 | Popovic et al. |
| 8,914,251 B2 | 12/2014 | Ohta |
| 9,117,134 B1 | 8/2015 | Geiss et al. |
| 9,256,973 B2 | 2/2016 | Koperwas et al. |
| 9,317,954 B2 | 4/2016 | Li et al. |
| 9,483,860 B2 | 11/2016 | Hwang et al. |
| 9,616,329 B2 | 4/2017 | Szufnara et al. |
| 9,741,146 B1 | 8/2017 | Nishimura |
| 9,811,716 B2 | 11/2017 | Kim et al. |
| 9,826,898 B1 | 11/2017 | Jin et al. |
| 9,858,700 B2 | 1/2018 | Rose et al. |
| 9,947,123 B1 | 4/2018 | Green |
| 9,984,658 B2 | 5/2018 | Bonnier et al. |
| 9,990,754 B1 | 6/2018 | Waterson et al. |
| 10,022,628 B1 | 7/2018 | Matsumiya et al. |
| 10,096,133 B1 | 10/2018 | Andreev |
| 10,118,097 B2 | 11/2018 | Stevens |
| 10,198,845 B1 | 2/2019 | Bhat et al. |
| 10,388,053 B1 | 8/2019 | Carter, Jr. et al. |
| 10,403,018 B1 | 9/2019 | Worsham |
| 10,535,174 B1 | 1/2020 | Rigiroli et al. |
| 10,726,611 B1 | 7/2020 | Court |
| 10,733,765 B2 | 8/2020 | Andreev |
| 10,755,466 B2 | 8/2020 | Chamdani et al. |
| 10,792,566 B1 | 10/2020 | Schmid |
| 10,860,838 B1 | 12/2020 | Elahie et al. |
| 10,878,540 B1 | 12/2020 | Stevens |
| 10,902,618 B2 | 1/2021 | Payne et al. |
| 2002/0054054 A1 | 5/2002 | Sanbe |
| 2002/0089504 A1 | 7/2002 | Merrick et al. |
| 2002/0180739 A1 | 12/2002 | Reynolds et al. |
| 2003/0038818 A1 | 2/2003 | Tidwell |
| 2004/0027352 A1 | 2/2004 | Minakuchi |
| 2004/0227760 A1 | 11/2004 | Anderson et al. |
| 2004/0227761 A1 | 11/2004 | Anderson et al. |
| 2005/0237550 A1 | 10/2005 | Hu |
| 2006/0036514 A1 | 2/2006 | Steelberg et al. |
| 2006/0149516 A1 | 7/2006 | Bond et al. |
| 2006/0217945 A1 | 9/2006 | Leprevost |
| 2006/0262114 A1 | 11/2006 | Leprevost |
| 2007/0085851 A1 | 4/2007 | Muller et al. |
| 2007/0097125 A1 | 5/2007 | Xie et al. |
| 2008/0049015 A1 | 2/2008 | Elmieh et al. |
| 2008/0111831 A1 | 5/2008 | Son et al. |
| 2008/0152218 A1* | 6/2008 | Okada ................ G06K 9/6282 382/159 |
| 2008/0268961 A1 | 10/2008 | Brook |
| 2008/0316202 A1 | 12/2008 | Zhou et al. |
| 2009/0066700 A1 | 3/2009 | Harding et al. |
| 2009/0315839 A1 | 12/2009 | Wilson et al. |
| 2010/0134501 A1 | 6/2010 | Lowe et al. |
| 2010/0251185 A1 | 9/2010 | Pattenden |
| 2010/0277497 A1 | 11/2010 | Dong et al. |
| 2011/0012903 A1 | 1/2011 | Girard |
| 2011/0074807 A1 | 3/2011 | Inada et al. |
| 2011/0086702 A1 | 4/2011 | Borst et al. |
| 2011/0119332 A1 | 5/2011 | Marshall et al. |
| 2011/0128292 A1 | 6/2011 | Ghyme et al. |
| 2011/0164831 A1 | 7/2011 | Van Reeth et al. |
| 2011/0187731 A1 | 8/2011 | Tsuchida |
| 2011/0269540 A1 | 11/2011 | Gillo et al. |
| 2011/0292055 A1 | 12/2011 | Hodgins et al. |
| 2012/0083330 A1 | 4/2012 | Ocko |
| 2012/0115580 A1 | 5/2012 | Hornik et al. |
| 2012/0220376 A1 | 8/2012 | Takayama et al. |
| 2012/0244941 A1 | 9/2012 | Ostergren et al. |
| 2012/0303343 A1 | 11/2012 | Sugiyama et al. |
| 2012/0313931 A1 | 12/2012 | Matsuike et al. |
| 2013/0050464 A1 | 2/2013 | Kang |
| 2013/0063555 A1 | 3/2013 | Matsumoto et al. |
| 2013/0120439 A1 | 5/2013 | Harris et al. |
| 2013/0121618 A1 | 5/2013 | Yadav |
| 2013/0222433 A1 | 8/2013 | Chapman et al. |
| 2013/0235045 A1 | 9/2013 | Corazza et al. |
| 2013/0263027 A1 | 10/2013 | Petschnigg et al. |
| 2013/0311885 A1 | 11/2013 | Wang et al. |
| 2014/0002463 A1 | 1/2014 | Kautzman et al. |
| 2014/0198106 A1 | 7/2014 | Sumner et al. |
| 2014/0198107 A1 | 7/2014 | Thomaszewski et al. |
| 2014/0327694 A1 | 11/2014 | Cao et al. |
| 2015/0113370 A1 | 4/2015 | Flider |
| 2015/0126277 A1 | 5/2015 | Aoyagi |
| 2015/0187113 A1 | 7/2015 | Rubin et al. |
| 2015/0235351 A1 | 8/2015 | Mirbach et al. |
| 2015/0243326 A1 | 8/2015 | Pacurariu et al. |
| 2015/0381925 A1 | 12/2015 | Varanasi et al. |
| 2016/0026926 A1 | 1/2016 | Yeung et al. |
| 2016/0071470 A1 | 3/2016 | Kim et al. |
| 2016/0217723 A1 | 7/2016 | Kim et al. |
| 2016/0307369 A1 | 10/2016 | Freedman et al. |
| 2016/0314617 A1 | 10/2016 | Forster et al. |
| 2016/0354693 A1 | 12/2016 | Yan et al. |
| 2017/0301310 A1 | 10/2017 | Bonnier et al. |
| 2017/0301316 A1 | 10/2017 | Farell |
| 2018/0122125 A1* | 5/2018 | Brewster ................ G06T 13/40 |
| 2018/0165864 A1 | 6/2018 | Jin et al. |
| 2018/0211102 A1 | 7/2018 | Alsmadi |
| 2019/0139264 A1 | 5/2019 | Andreev |
| 2021/0019916 A1 | 1/2021 | Andreev |

FOREIGN PATENT DOCUMENTS

| | | |
|---|---|---|
| CN | 105405380 A | 3/2016 |
| CN | 105825778 A | 8/2016 |

OTHER PUBLICATIONS

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 pages.

Belytschko et al., Nonlinear Finite Elements for Continua and Structures, Second Edition, Wiley (Jan. 2014), 727 pages (uploaded in 3 parts).

Blanz V, Vetter T. A morphable model for the synthesis of 3D faces. In Proceedings of the 26th annual conference on Computer graphics and interactive techniques Jul. 1, 1999 (pp. 187-194). ACM Press/Addison-Wesley Publishing Co.

Blanz et al., "Reanimating Faces in Images and Video" Sep. 2003, vol. 22, No. 3, pp. 641-650, 10 pages.

Chao et al., "A Simple Geometric Model for Elastic Deformations", 2010, 6 pgs.

(56) References Cited

OTHER PUBLICATIONS

Cook et al., Concepts and Applications of Finite Element Analysis, 1989, Sections 6-11 through 6-14.
Cournoyer et al., "Massive Crowd on Assassin's Creed Unity: AI Recycling," Mar. 2, 2015, 55 pages.
Dick et al., "A Hexahedral Multigrid Approach for Simulating Cuts in Deformable Objects", IEEE Transactions on Visualization and Computer Graphics, vol. X, No. X, Jul. 2010, 16 pgs.
Diziol et al., "Robust Real-Time Deformation of Incompressible Surface Meshes", to appear in Proceedings of the 2011 ACM SIGGRAPH/Eurographics Symposium on Computer Animation (2011), 10 pgs.
Dudash, Bryan. "Skinned instancing." NVidia white paper(2007).
Fikkan, Eirik. Incremental loading of terrain textures. MS thesis. Institutt for datateknikk og informasjonsvitenskap, 2013.
Geijtenbeek, T. et al., "Interactive Character Animation using Simulated Physics", Games and Virtual Worlds, Utrecht University, The Netherlands, The Eurographics Association 2011, 23 pgs.
Georgii et al., "Corotated Finite Elements Made Fast and Stable", Workshop in Virtual Reality Interaction and Physical Simulation VRIPHYS (2008), 9 pgs.
Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.
Han et al., "On-line Real-time Physics-based Predictive Motion Control with Balance Recovery," Eurographics, vol. 33(2), 2014, 10 pages.
Hernandez, Benjamin, et al. "Simulating and visualizing real-time crowds on GPU clusters." Computación y Sistemas 18.4 (2014): 651-664.
Hu G, Chan CH, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.
Hu Gousheng, Face Analysis using 3D Morphable Models, Ph.D. Thesis, University of Surrey, Apr. 2015, pp. 1-112.
Irving et al., "Invertible Finite Elements for Robust Simulation of Large Deformation", Eurographics/ACM SIGGRAPH Symposium on Computer Animation (2004), 11 pgs.
Kaufmann et al., "Flexible Simulation of Deformable Models Using Discontinuous Galerkin FEM", Oct. 1, 2008, 20 pgs.
Kavan et al., "Skinning with Dual Quaternions", 2007, 8 pgs.
Kim et al., "Long Range Attachments—A Method to Simulate Inextensible Clothing in Computer Games", Eurographics/ACM SIGGRAPH Symposium on Computer Animation (2012), 6 pgs.
Klein, Joseph. Rendering Textures Up Close in a 3D Environment Using Adaptive Micro-Texturing. Diss. Mills College, 2012.
Komura et al., "Animating reactive motion using momentum-based inverse kinematics," Computer Animation and Virtual Worlds, vol. 16, pp. 213-223, 2005, 11 pages.
Lee, Y. et al "Motion Fields for Interactive Character Animation", University of Washington, Bungie, Adobe Systems, 8 pgs, obtained Mar. 20, 2015.
Levine, S. et al., "Continuous Character Control with Low-Dimensional Embeddings", Stanford University, University of Washington, 10 pgs, obtained Mar. 20, 2015.
Macklin et al., "Position Based Fluids", to appear in ACM TOG 32(4), 2013, 5 pgs.
McAdams et al., "Efficient Elasticity for Character Skinning with Contact and Collisions", 2011, 11 pgs.
McDonnell, Rachel, et al. "Clone attack! perception of crowd variety." ACM Transactions on Graphics (TOG). vol. 27. No. 3. ACM, 2008.

Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Musse, Soraia Raupp, and Daniel Thalmann. "Hierarchical model for real time simulation of virtual human crowds." IEEE Transactions on Visualization and Computer Graphics 7.2 (2001): 152-164.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Ruiz, Sergio, et al. "Reducing memory requirements for diverse animated crowds." Proceedings of Motion on Games. ACM, 2013.
Rungjiratananon et al., "Elastic Rod Simulation by Chain Shape Matching withTwisting Effect" SIGGRAPH Asia 2010, Seoul, South Korea, Dec. 15-18, 2010, ISBN 978-1-45030439-9/10/0012, 2 pgs.
Seo et al., "Compression and Direct Manipulation of Complex Blendshape Models", Dec. 2011, in 10 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Stomakhin et al., "Energetically Consistent Invertible Elasticity", Eurographics/ACM SIGRAPH Symposium on Computer Animation (2012), 9 pgs.
Thalmann, Daniel, and Soraia Raupp Musse. "Crowd rendering." Crowd Simulation. Springer London, 2013. 195-227.
Thalmann, Daniel, and Soraia Raupp Musse. "Modeling of Populations." Crowd Simulation. Springer London, 2013. 31-80.
Treuille, A. et al., "Near-optimal Character Animation with Continuous Control", University of Washington, 2007, 7 pgs.
Ulicny, Branislav, and Daniel Thalmann. "Crowd simulation for interactive virtual environments and VR training systems." Computer Animation and Simulation 2001 (2001 ): 163-170.
Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.
Vigueras, Guillermo, et al. "A distributed visualization system for crowd simulations." Integrated Computer-Aided Engineering 18.4 (2011 ): 349-363.
Wu et al., "Goal-Directed Stepping with Momentum Control," Eurographics/ ACM SIGGRAPH Symposium on Computer Animation, 2010, 6 pages.

\* cited by examiner

PARTICLE-BASED INVERSE KINEMATIC RENDERING SYSTEM

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Demand for ever increasing realism and detail in computer-implemented video games seems to drive the growth of computer performance. Unlike computer animation and movie rendering which can process individual scenes over time for playback at a higher frame rate, computer-implemented video games and computer-implemented simulators must render complete, three-dimensional (3D) scenes of a virtual game environment during runtime of the game application, typically at a rate of thirty (30) frames per second or better. It can be difficult to produce animations that appear lifelike, fluid, and realistic when rendering during runtime of the game application.

SUMMARY OF EMBODIMENTS

The systems, methods, and devices of this disclosure each have several innovative aspects, no single one of which is solely responsible for the all of the desirable attributes disclosed herein.

One embodiment discloses a system comprising: a data store comprising game application data; a data store comprising a plurality of prediction models associated with a virtual character model; and a computing device in electronic communication with the data store and configured to execute a game application based in part on the game application data, the game application configured to: generate a virtual game environment; determine a first pose of a first virtual character model within the virtual game environment, the first virtual character model comprising a plurality of a rigid bodies connected by a plurality of joints, wherein the first pose is a first arrangement of the rigid bodies and joints of the first virtual character model; receive an instruction to change the first pose of the first virtual character model based at least in part on the movement of a joint of the first virtual character model; calculate an estimated pose of the first virtual character model based at least in part on a first prediction model of the plurality of prediction models, wherein the first prediction model is associated with at least a first subset of the plurality of joints of the first virtual character model; calculate an updated pose of first virtual character model based, at least in part, on the predictive pose and a second prediction model of the plurality of prediction models, wherein the second prediction model associated with at least a second subset of the plurality of joints of the first virtual character model; render the first virtual character model based, at least in part on the updated pose of the first virtual character model; and generate instructions to output a frame comprising at least a portion of the updated pose of the first virtual character model for a user display.

Another embodiment discloses a computer-implemented method comprising: as implemented by a user computing device configured with specific computer-executable instructions for executing a game application, generating a virtual environment; determining a first pose of a first virtual character model within the virtual game environment, the first virtual character model comprising a plurality of a rigid bodies connected by a plurality of joints, wherein the first pose is a first arrangement of the rigid bodies and joints of the first virtual character model; receiving an instruction to change the first pose of the first virtual character model based at least in part on the movement of a joint of the first virtual character model; calculating an estimated pose of the first virtual character model based at least in part on a first prediction model, wherein the first prediction model is associated with at least a first subset of the plurality of joints of the first virtual character model; calculating an updated pose of first virtual character model based, at least in part, on the predictive pose and a second prediction model, wherein the second prediction model associated with at least a second subset of the plurality of joints of the first virtual character model; rendering the first virtual character model based, at least in part on the updated pose of the first virtual character model; and generating instructions to output a frame comprising at least a portion of the updated pose of the first virtual character model for a user display.

Another embodiment discloses a non-transitory computer-readable storage medium having stored thereon instructions that, when executed, direct a computing system to perform a method for rendering frames within a game application, the method comprising: generating a virtual environment; determining a first pose of a first virtual character model within the virtual game environment, the first virtual character model comprising a plurality of a rigid bodies connected by a plurality of joints, wherein the first pose is a first arrangement of the rigid bodies and joints of the first virtual character model; receiving an instruction to change the first pose of the first virtual character model based at least in part on the movement of a joint of the first virtual character model; calculating an estimated pose of the first virtual character model based at least in part on a first prediction model, wherein the first prediction model is associated with at least a first subset of the plurality of joints of the first virtual character model; calculating an updated pose of first virtual character model based, at least in part, on the predictive pose and a second prediction model, wherein the second prediction model associated with at least a second subset of the plurality of joints of the first virtual character model; rendering the first virtual character model based, at least in part on the updated pose of the first virtual character model; and generating instructions to output a frame comprising at least a portion of the updated pose of the first virtual character model for a user display.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION OF EMBODIMENTS

Overview

Figure 1:
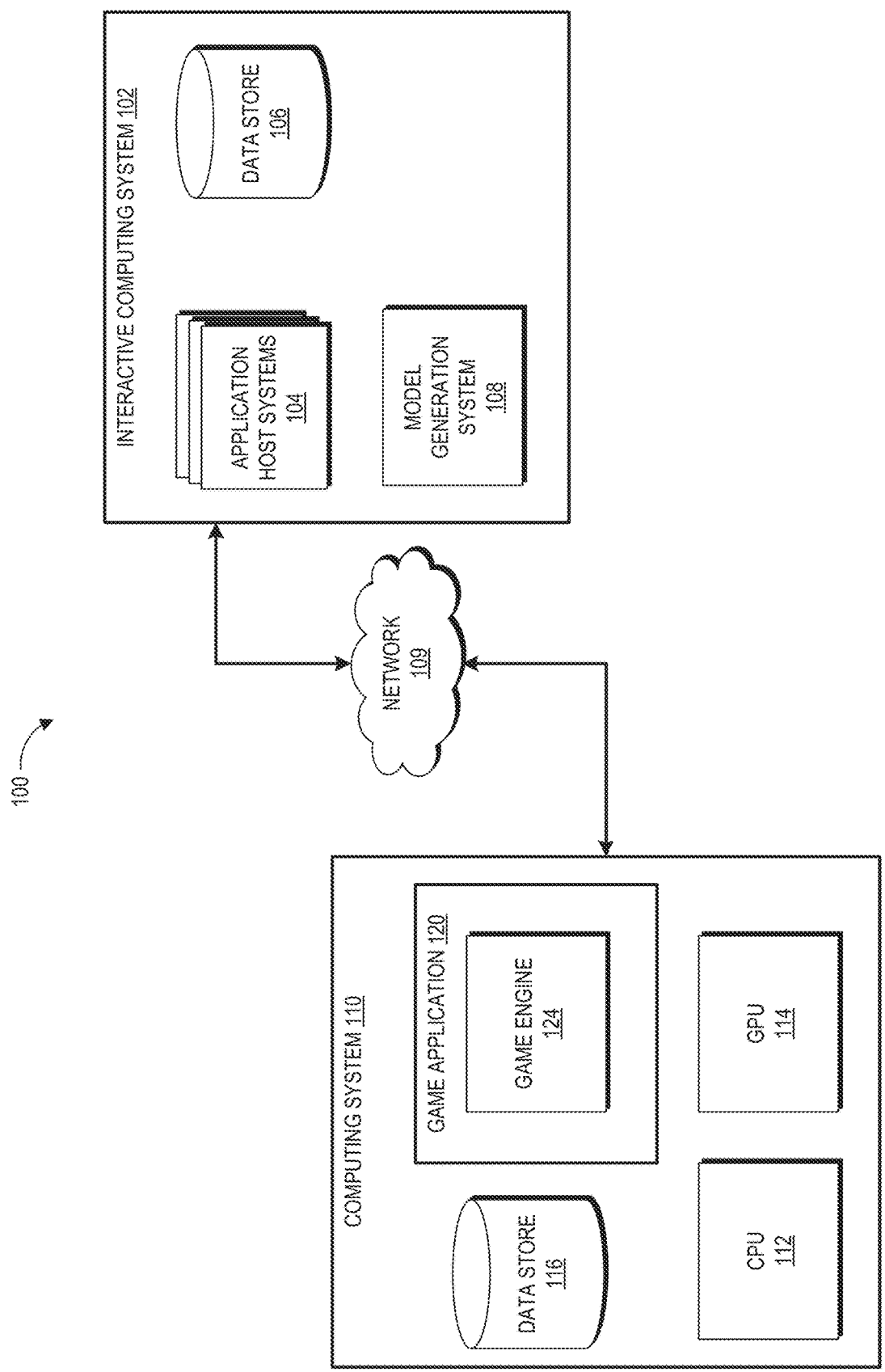
FIG. 1 illustrates an embodiment of a game system.

A video game application can use sequences of animations to help when rendering frames of the game application. The animations can be used when generating poses for character models or other virtual entities within a game environment. For example, when a character interacts with an object (such as, kicking a ball) or contacts another character, the game application can generate a series of poses of the character model performing the actions. As another example, when a character picks up an object or opens a door, the game may present a series of frames of the character performing the action. In some game applications, at least some of the poses of the character model may be created using motion capture technology. By using motion capture technology, more lifelike animations can be created as compared to other animation techniques.

An animated character can be modeled with a skeleton of rigid segments connected with joints, called a kinematic chain. During a video game, the game system determines a pose for the character at each frame, which includes positioning each joint and rigid segment of the character model. One methodology for generating the pose is to use an inverse kinematic animation system. An inverse kinematics problem can provide an expression that takes a position of an end-effector s input and gives joint positions for each joint in the character model as output. For example, the pose of the character model can be calculated based on the position of the foot when it strikes a ball within the game application. One of the problems associated with an inverse kinematic analysis is that there is a large range of freedom that is created by all of the different joints. Even with constraints, the kinematic chain of the character model is generally under constrained. By having an under constrained system, the iterative process for arriving at a solution using an inverse kinematic analysis can be extremely time consuming and costly to solve during runtime of the game application. Additionally, the system can arrive at any number of different solutions, many of which can result in poses that are not realistic or lifelike.

One solution is to utilize a particle-based inverse kinematic analysis system. The inverse kinematic system can utilize a neural network, also referred to as a deep neural network, which utilizes machine learning processes in order to create poses that are more life-like and realistic. The system can generate prediction models using motion capture data. The motion capture data can be aggregated and analyzed in order to train the neural network. The neural network can determine rules and constraints that govern how joints and connectors of a character model move in order to create realistic motion of the character model within the game application.

During runtime of a game application, the game engine can use a two stage process to generate poses within the game environment. In the first stage, a predictive analysis can be performed using one or more neural network models in order to output an estimated pose of the character model. In the second stage, a particle solver can utilize the estimated pose and another neural network in order to iteratively solve a final pose of the character model.

Although this disclosure focuses on videogames, it should be understood that embodiments described herein can be used with other types of software applications. For example, an educational application, a cartoon, a training application, a simulator, or a help guide within an application may each use one or more embodiments of the present disclosure. Characters can represent people, animals, creatures, cars, or any virtual entities within the game environment.

Overview of Game System Embodiments

FIG. 1 illustrates an embodiment of a computing environment for implementing one or more embodiments of a particle-based inverse kinematic system, also referred to as an IK analysis system or an IK system. The computing environment 100 can include a computing system 110 and an interactive computing system 102. The computing system 110 can execute a game application 120 which can host a game engine 124 and allow a player to play the game application 120.

The computing system 110 can communicate with the interactive computing system 102 via the network 140. The interactive computing system 102 can include a remote application 150 which can facilitate the execution of the game application 120 or provide one or more server side developer tools, a data store 106 configured to store information (such as graphics and computer code) associated with the game application 120 or model generation system 108, and application host systems 104 which can be configured to host at a portion of the game application 120. To simplify discussion and not to limit the present disclosure, FIG. 1 illustrates one computing system 110 and one interactive computing system 102, though multiple systems may be used.

Computing System

The computing system 110 can include a central processing unit (CPU) 112, a graphics processing unit (GPU) 114, and a data store 116. The computing system 110 may be implemented on a computing device such as the computing device 10 illustrated in FIG. 12. The computing system 110 may be in communication with the interactive computing system 102. For example, the interactive computing system 102 can communicate updates of the game application 120 to the computing system 110. The computing system 110 may use the CPU 112, the GPU 114, and the data store 116 to execute a game application 120. The game application 120 may be part of a game engine 118 which can include instructions causing the CPU 112 and/or the GPU 114 to execute at least a portion of the game application 120. The game application 120 can also implement the inverse kinematic processing system. The inverse kinematic processing system can be integrated into the game application (for example, such as incorporated into the game engine 124).

The computing system 110 may include hardware and software components for establishing communications over a communication network 109. For example, the computing system 110 may be equipped with networking equipment and network software applications (for example, a web browser) that facilitates communications via one or more networks (for example, the Internet or an intranet).

Game Application

The computing system 110 may execute a game application 120. The game application 120 may be an offline game which can be run locally on the computing system 110. The game application 120 may also be an online game which can involve communications among multiple computing systems. The computing system 110 can execute a game application 120 that may be stored and/or executed in a distributed environment. For example, the computing system 110 may execute a portion of a game and the interactive computing system 102, or an application host system 104 of the interactive computing system 102 may execute another portion of the game. For instance, the game may be a massively multiplayer online role-playing game (MMORPG) that includes a client portion executed by the computing system 110 and a server portion executed by one or more application host systems 104. For the present discussion, the game application 120 can include a distributed application or an application that includes a portion that executes on the computing system 110 and a portion that executes on at least one of the application host systems 104. Detailed elements of the game application 120 are further described with reference to the game system 200 in FIG. 2.

Game Engine

The game application 120 can include a game engine 124. The game engine 124 can be loaded into the memory on the computing system 110 and can act as an interface or hub for one or more game applications 120 that interfaces with the application host systems 134.

The game engine 124 can be configured to execute aspects of the operation of the game application 120 according to game rules. Examples of game rules can include rules for scoring, possible inputs, actions/events, movement in response to inputs, and the like. Other components can control what inputs are accepted and how the game progresses, and other aspects of gameplay. The game engine 124 can receive the user inputs and determine in-game events, such as actions, jumps, runs, throws, attacks, and other events appropriate for the game application 120. During runtime operation, the game engine 124 can read user inputs, in-game data, and game state information to determine the appropriate in-game events. Additional examples of the game engine are further described in FIG. 2.

Data Store

The computing system 110 can include a data store 116. The data store 116 can be configured to store data that may be generated or used by the computing system 110. For example, the data store 116 may store instructions for executing the game application 120 and game engine 124.

Interactive Computing System

The interactive computing system 102 may include a model generation system 108, application host systems 104, and a data store 106. The interactive computing system 102 may be part of the computing device 10 in FIG. 12. A game developer may use the interactive computing system 102 to customize various features of the game application 120.

Application Host Systems

As described with reference to the computing system 110, the application host systems 104 can host at least a portion of the game application 120. The application host systems 104 can be configured to execute a portion of the game application 120 and/or game engine 124. In certain embodiments, instead of or in addition to executing a portion of the game application 120 and/or game engine 124, the application host systems 104 may execute another application, which may complement and/or interact with the game application 120 during the execution of an instance of the game application 120.

The interactive computing system 102 may enable multiple players or computing systems to access a portion of the game application 120 and/or game engine 124 executed or hosted by the interactive computing system 102. In some embodiments, the portion of the game application 120 executed by application host systems 104 of the interactive computing system 102 may create a persistent virtual world. This persistent virtual world may enable one or more players to interact with the virtual world and with each other in a synchronous and/or asynchronous manner. In some embodiments, the application host systems 104 may execute a hosting system for executing various aspects of a game environment. For example, in one embodiment, the game application 120 may be a competitive game, such as a first person shooter or sports game, and the application host systems 104 can provide a dedicated hosting service for hosting multiplayer game instances or facilitate the creation of game instances hosted by player computing devices. In some embodiments, the application host systems 104 can provide a lobby or other environment for players to virtually interact with one another. Such environments may include environments for conducting transactions between players, such as an auction house or type of environment for facilitating transactions.

Model Generation System

The model generation system 108 can use one or more machine learning algorithms to generate one or more deep neural networks, prediction models, or parameter functions. One or more of these parameter functions may be used to determine an expected value or occurrence based on a set of inputs. For example, a prediction model can be used to generate an estimated pose for a character model in a video game 120 based on one or more inputs to the prediction model, such as, for example, the positions of one or more joints within the character model. A number of different types of algorithms may be used by the model generation system 108. For example, certain embodiments herein may use a fully connected deep neural network. However, other models are possible, such as a logistical regression model, a linear regression model, a discrete choice model, or a generalized linear model.

The machine learning algorithms can be configured to adaptively develop and update the models over time based on new input received by the model generation system 108. For example, the models can be regenerated on a periodic basis of new motion capture data available to help keep the model more accurate. The model generation system 108 is described in more detail herein. After a model is generated, such as a deep neural network, it can be provided to the game engine 124 to facilitate the generation of poses during runtime of the game application.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

Data Store

The data store 106 can store information associated with the game application, such as a virtual environment of the game application 120, game rules, model data for the model generation system 108, as well as assets in the game application 120, such as graphical appearances and animations of game characters.

Example Embodiment of a Game System

Figure 2:
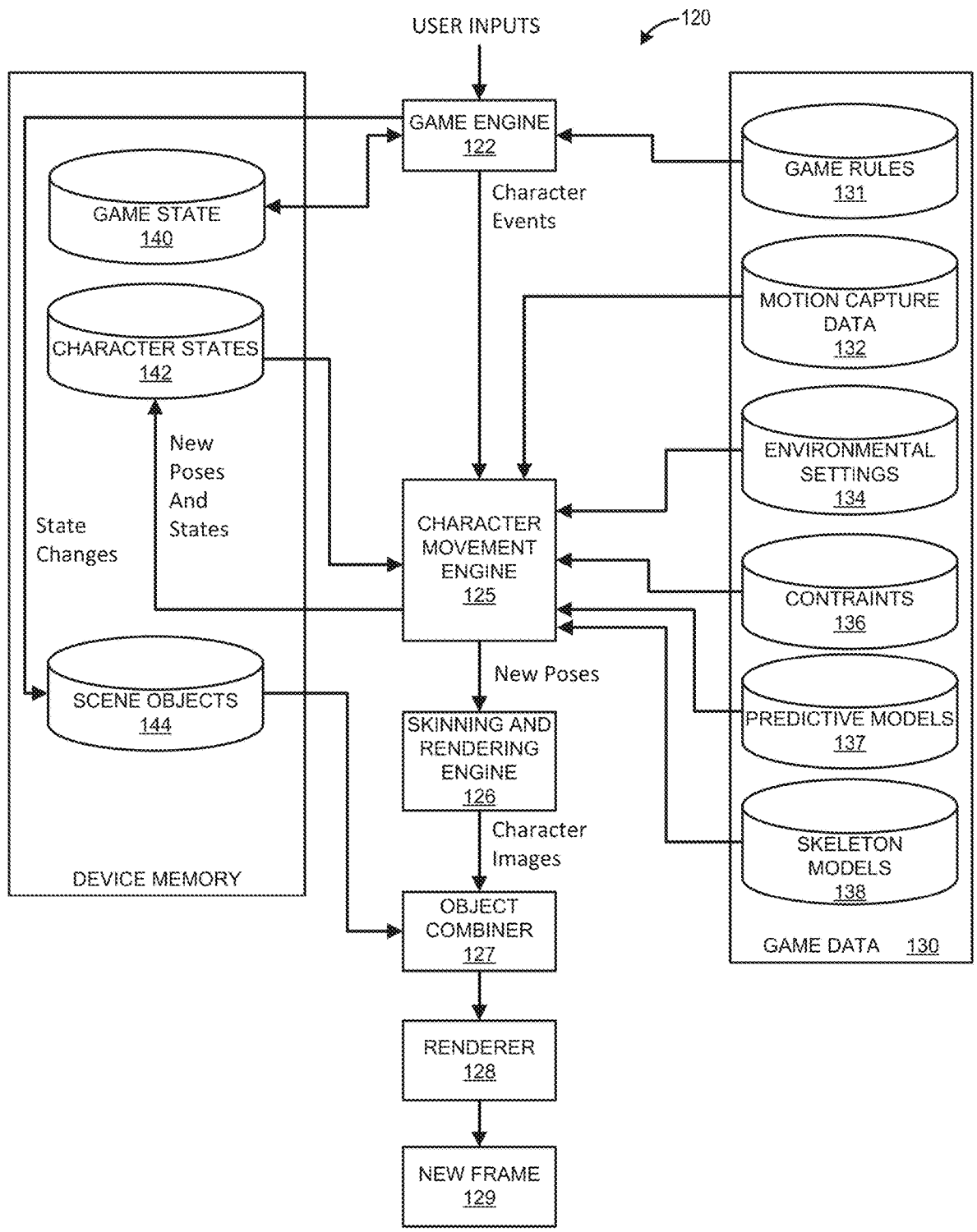
FIG. 2 illustrates an embodiment of elements of a game system.

FIG. 2 illustrates an embodiment of components of a game application system 100 for generating, rendering, and outputting frames for display during operation of the game application. The game application system 120 receives user inputs and generates commands configured to output video and audio data. The computing system 110 and/or display can provide the corresponding video and audio output to the user. During operation of a game application, the output video data is generated as a series of frames. Preferably, the game application is capable of generating frames at a rate that does not diminish the gameplay experience for the user (for example, at least 30 frames per second).

In one embodiment, a game engine 120 receives the user inputs and determines character events, such as actions, collisions, runs, throws, attacks and other events appropriate for the game. The character events are conveyed to a character movement engine 124 that determines the appropriate motions the characters and determines new poses for the characters and provides those new poses to a skinning and rendering engine 126, which in turn provides character images to an object combiner 127 to combine animate, inanimate and background objects into a full scene. The full scene is conveyed to a renderer 128, which generates a new frame 129 therefrom.

Game code/data 130 is shown comprising game rules 131, prerecorded motion capture poses/paths 132, environmental settings 134, constraints 136 (such as strength and velocity constraints), and skeleton models 138. The device executing the game might have memory 106 for game state 140, character states 142 and scene object storage 144. Character states 142 can comprise storage for a current pose of characters being animated.

During operation, the game engine 124 reads in game rules 131 and considers game state 140 to arrive at character events. Character movement engine 125 reads in data from a motion capture data repository 132 as well as character states 142. The motion capture data repository 132 can store motion capture video and/or motion capture images that may be used to generate procedural animation.

Figure 3:
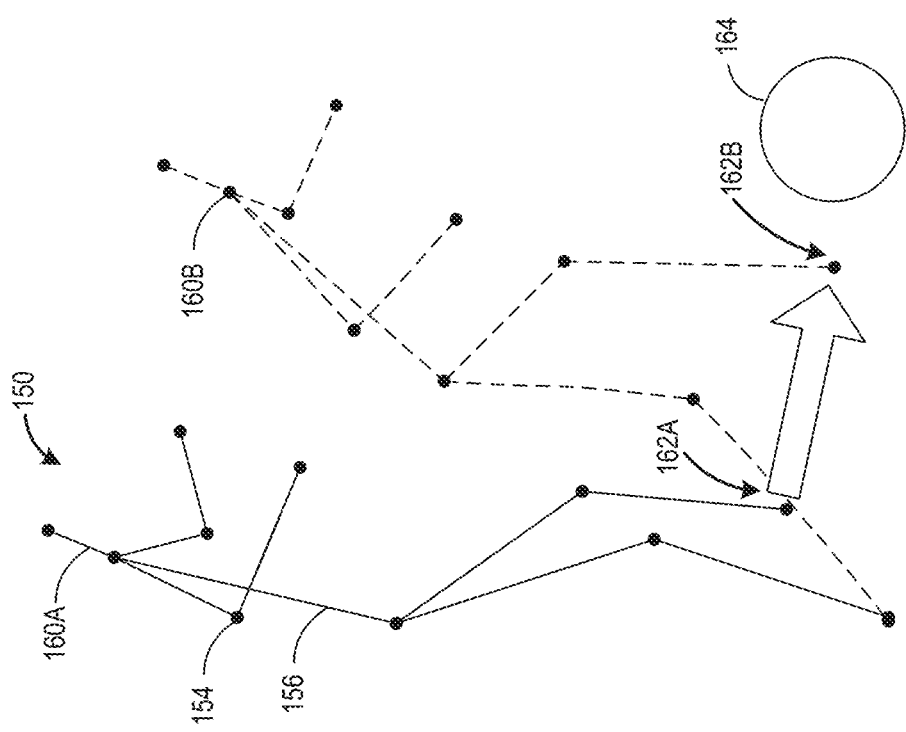
FIG. 3 illustrates an embodiment of aspects of character models for use in a particle-based inverse kinematic process.

The character movement engine 125 can use skeleton models 138, also referred to as rigs. Rigs are often used in character animations. A typical rig may comprise a collection of character components, such as a skeletal structure and a mesh to be skinned over the skeletal structure. A typical rig comprises a skeletal structure for a character and includes a plurality of degrees of freedom. A rig may also comprise a set of animation controls that enable an animator to move the various components of the character in order to create motion in an animation. Character movement engine 125 might also introduce character movements for randomness, personality, and so forth. FIG. 3 provides an example embodiment of simplified skeletal models for purposes of illustrating the concepts and processes disclosed herein.

The character movement engine 125 can also include inputs from the environmental settings 134, character states such as current poses (for example, positions of body parts expressed as positions, joint angles or other specifications), and velocities (linear and/or angular) of body parts and motions, which can be in the form of a set of force/torque vectors for some or all body parts, prediction models 137. From this information, the character movement engine 125 generates new poses for the characters using rules of physics, and those new poses can be used to update character states 142 and are also provided to rendering engine 114. Where invisible skeleton models are used, character states 142 might contain current position of visible "graphics" of characters as well as the invisible rag-doll skeleton characters.

The skinning and rendering engine 114 takes into account the surfaces, colors and textures of the body parts of posed characters and renders character images. Object combiner 116 can then combine the character images with inanimate and background objects obtained from scene objects store 114 to provide a complete scene to renderer 118.

In some embodiments, the character movement engine 125 can implement a particle-based inverse kinematic analysis system. The character movement engine 125 may generate an estimated pose for a character model in response to, for example, a character event. The estimated pose may be generated on a frame-by-frame basis and can be based at least in part on one or more prediction models received from the prediction model repository 137. For example, the prediction model may be a deep neural network associated with a portion of the joints of character model. The character movement engine 125 can use the prediction model and other rules and constraints associated with the character model in order to generate the estimated pose. After generation of the estimated pose, the character movement engine 125 can generate an updated final pose for the character model using a particle based solver in conjunction with one or more prediction models. The updated pose can be provided to the skinning and rendering engine 114 for rendering of the character model within the game environment. The updated target pose may be used for a subsequent frame, and the process of generating a new pose may be repeated.

Advantageously, in certain embodiments, using the prediction models to generate an estimated pose and an updated final pose enables more fluid procedural animation compared to pre-existing processes. Further, the use of procedural animation can result in a larger variety of animation within a game while reducing storage space for the game data 104 of a game. In certain embodiments, one or more of the game application 120, the game engine 124, or the character movement engine 125, the interactive computing system 102, and the model generation system 108, among other systems may be configured to execute the processes discussed herein.

Character Model Embodiments

FIG. 3 illustrates an embodiment of positions of a character model 150. The character model 150 can be movable and is illustrated in a first pose 160A and a second pose 160B. The character model 150 can include a mesh (not shown) and the illustrated skeleton frame, which includes a plurality of elements, such as joints 154 and rigid bodies 156. The character model 150 can be referred to as a rig. The illustrated character model 150 has been simplified for clarity. A character model 150 for use within a game application may include any number of joints, members, meshes, and data that can be used to represent a character or entity within a game environment.

In the illustrated embodiment, the character 150 moves from the first pose 160A to the second pose 160B based on the movement of the an end-effector joint (such as, a foot) from the first position 162A to the second position 162B in order to engage the object 164 (such as a soccer ball). The system can perform an inverse kinematic analysis for movement of the positions of the joints and rigid segments of the character model 150 based on the placement of the end-effector in the second position 162B. The system can generate the second pose 160B for character model based on a particle-based inverse kinematic analysis. An example of the inverse kinematic analysis is described in further detail with respect to FIGS. 4A-4D.

Examples Embodiments of a Particle-Based Inverse Kinematic Analysis

Figure 4A:
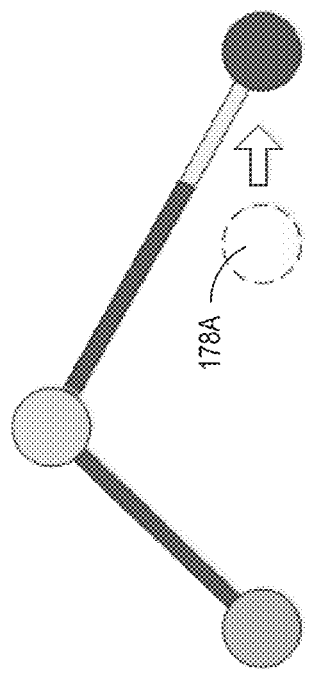
FIGS. 4A-4D illustrate aspects of a particle-based inverse kinematic process.
Figure 4B:
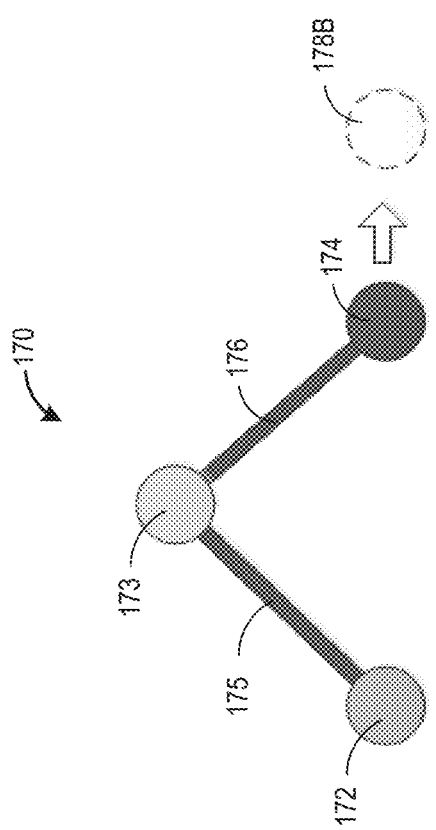

FIGS. 4A-4D illustrate aspects of a particle-based inverse kinematic analysis. FIGS. 4A through 4D illustrate a simplified example of a subset of elements of a character model 170 for an inverse kinematic analysis. The character model 170 includes a plurality of joints 172, 173, 174 and connectors 175, 176. The end-effector joint 174 moves from the first position 178A to the second position 178B as illustrated in FIG. 4B. FIG. 4B illustrates the end-effector joint 174 in the second position 178B. In order to move 174 to the second position 178B the connector 176 would have to be extended. Each connector is a rigid body and the system performs an inverse kinematic analysis in order to determine a solution. Each connector and joint can be defined accordingly to a series of rules and/or constraints. The rules and/or constraints govern how the connectors and joints can be moved and manipulated within the character model 170 and within the game application 120.

In order to compensate for the extension of the connector 176 the other joints and connectors need to be moved in accordance with the defined constraints. The IK system can iteratively solve the problem in order to arrive at the final position of each element of the character model 170, as illustrated in FIG. 4D. However, as discussed above, even with constraints, the kinematic chain of the character model is generally under constrained. By having an under constrained system, the iterative process for arriving at a solution using an inverse kinematic analysis can be extremely time consuming. Additionally, even with the constraints, the resulting poses and animations can look less life-like and take on a rubbery appearance.

Figure 4C:
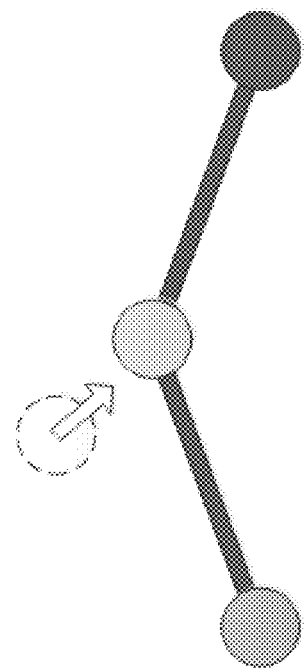
Figure 4D:
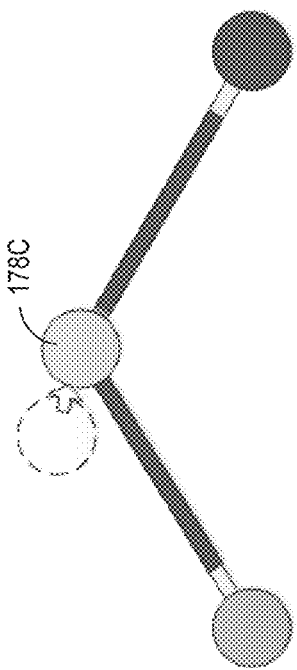

In order to reduce the computation time and/or generate more realistic poses, the IK system can generate an estimated pose for the model, such as illustrated in FIG. 4C. In FIG. 4C, joint 173 moves to predictive position 178C. The predictive pose can be calculated based on a set of rules that define how a joint moves based on the movement of another joint. For a simple model, the rules can be easy to generate. However, as the complexity of the model increases, the number of rules and constraints can be difficult to generate for every situation. The predictive pose can be an approximation of the final position of an element. The predictive pose can help to significantly reduce the computation time of the final pose by reducing the amount of movement required by the model in order to arrive in the final position. Additionally, the predictive pose can be helpful in better approximating realistic poses.

The IK system can procedurally determine rules for a model using prediction models generated using machine learning. In some embodiments, the IK system can generate a deep neural network model, also referred to as a DNN model, using machine learning to generate estimated poses for elements within a model. The predicted pose generated by a predictive solver using the DNN model can then be used as input to a particulate solver in order to iteratively generate the final pose for the model. As will be discussed further herein the IK system can utilize a plurality of DNN models to generate predictive poses and final poses for a character model.

Figure 5B:
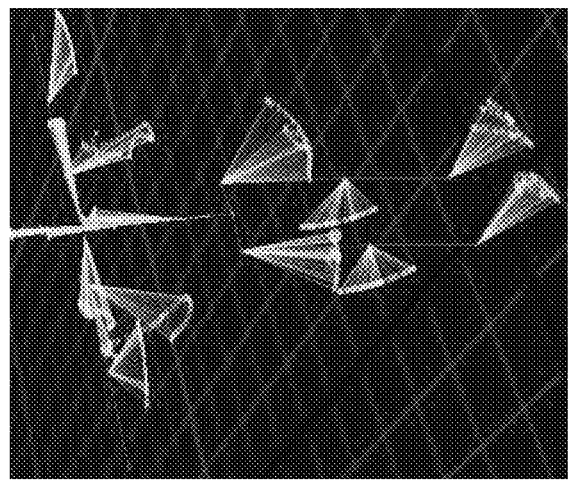
FIGS. 5A and 5B provides an example embodiment of angle constraints of a character model.
Figure 5A:
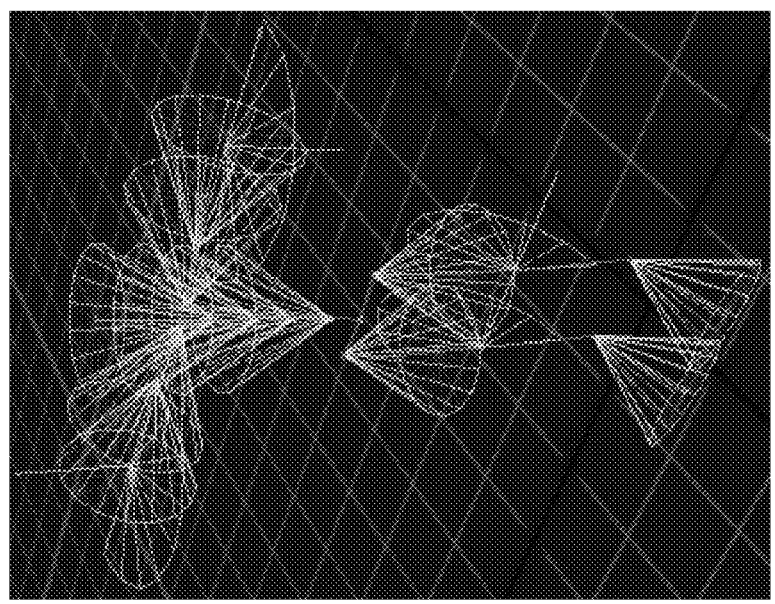

FIGS. 5A and 5B illustrate an example embodiment illustrating aspects of constraints of a node of a character model. FIG. 5A illustrates an example embodiment 180 of constraints for joints and connectors within a character model. In FIG. 5A each of the coned areas represent degrees of freedom or degrees of movement associated with each of the joints within the character model, which can also be referred to as a joint hierarchy or joint network 180A. As illustrated, each joint can have a defined range of movement. A joint can be coupled with one or more connectors. Generally, the connectors are rigid segments that are a defined length. As characters move within these degrees of freedom one of the problems that presents itself is the large range of freedom that is created by all of the different joints. By having so many degrees of freedom, even with the existing constraints, the model is usually under constrained. In order to reduce the degrees of freedom associated with each of the joints, the IK system can use machine learning to limit the angle constraints associated with each joint.

FIG. 5B illustrates an example embodiment of an updated range of motion for individual joints within the joint hierarchy 180B of the character model that have been determined using a machine learning process. The machine learning process can utilize motion capture data in order to determine updated angle constraints for each of joint of the character model. The motion capture data can provide data points associated with each joint, which can then be aggregated and analyzed by the machine learning system in order to generate the updated range of motion for individual joints within the joint hierarchy 180B, as illustrated in FIG. 5B. In some embodiments, the updated range of motion for individual joints can be generated for a specific game application based on the motion capture data. For example, the motions associated with a person playing soccer can be very different than the motions associated with a person playing volleyball. Each game application can have a different joint hierarchy. Motion capture data associated with the actions within the specific game can be used to provide a refined set of rules and constraints for each of the joints. By limiting the movement of each of the joints to actual movements of a real person can help to reduce computation time and generate realistic and life-like animations. An example embodiment of generation of angle constraints for a joint using motion capture data is further described with relation to FIGS. 6A-6E.

FIGS. 6A-6E illustrate an example embodiment a machine learning process for determining angle constraints of a node for a character model. The machine learning process can iteratively analyze and process motion capture data in order to determine constraints defining the range of motion for a joint that is more closely mapped to the observed limits of movements of human joints and limbs.

Figure 6A:
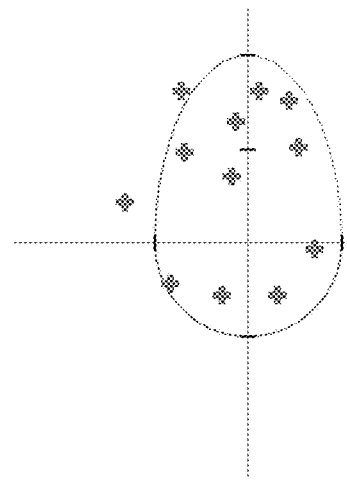
FIGS. 6A-6E illustrate an example embodiment of a machine learning process for determining constraints of a node for a virtual entity.
Figure 6B:
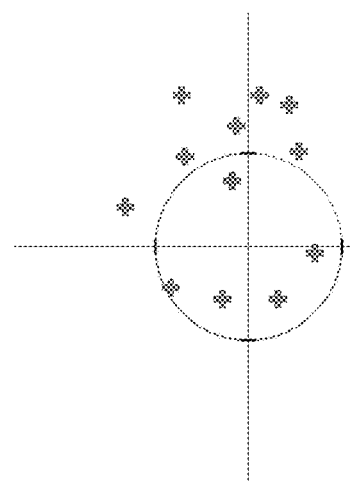
Figure 6C:
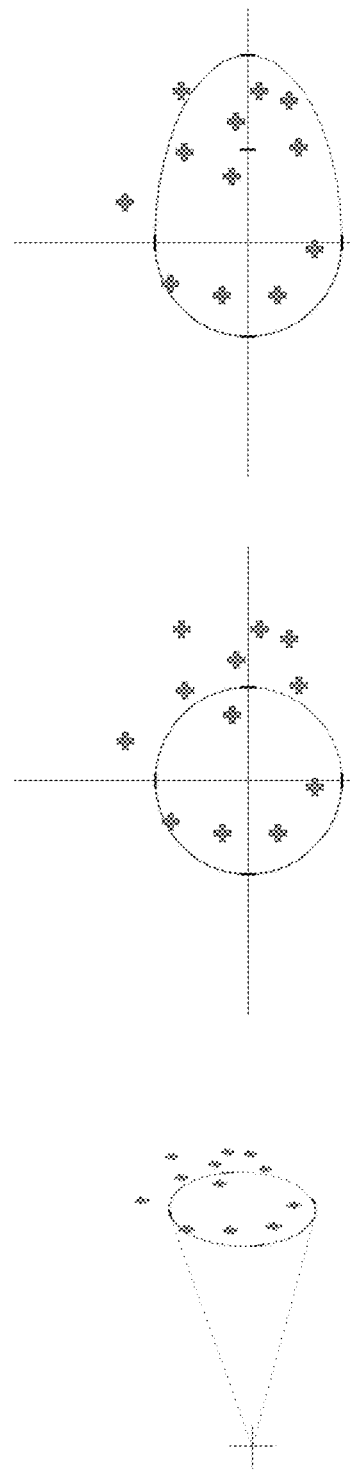
Figure 6E:
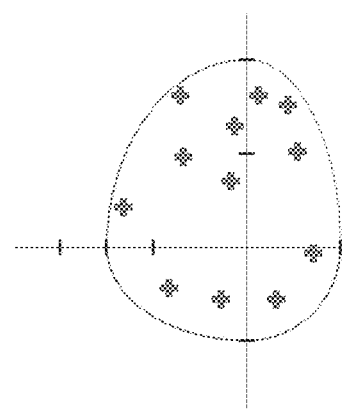
Figure 6D:
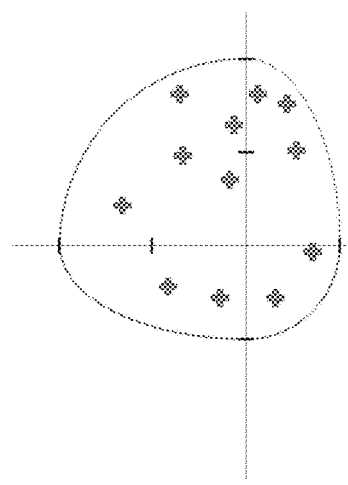

FIG. 6A illustrates a joint with a cone showing the range of movement of the joint. The motion capture data points illustrate locations of actual movement recorded during the motion capture process. FIG. 6B provides a two dimensional view of the cone and the motion capture data points. FIGS. 6B, 6C, 6D, and 6E illustrate example iterations of the machine learning process. In the example embodiment, the angle constraints are represented by an asymmetrical spherical cone. Each axis of the angle constraints may be modified in order to provide a refined joint constraint. The machine learning process can define rules and constraints that encompass all of the motion capture data that has been collected and remove areas that are within the range of motion of the motion capture data. FIG. 6E illustrates an example of the final angle constraints based on the motion capture data associated with the joint.

The IK system can define angle constraints and rules for each joint within the character model. As stated previously, an example embodiment of refined ranges and constraints of joints within a joint hierarchy 180B is illustrated in FIG. 5B. The illustrated examples have been simplified for illustrative purposes. The machine learning process can analyze thousands of data points, or more, from the motion capture data and perform hundreds of iterations, or more, in order to generate the constraints associated with each node. The angle constraints only control limitations at each joint within the character model and by themselves cannot create a believable pose.

Example Embodiment of a Prediction Model

Figure 7:
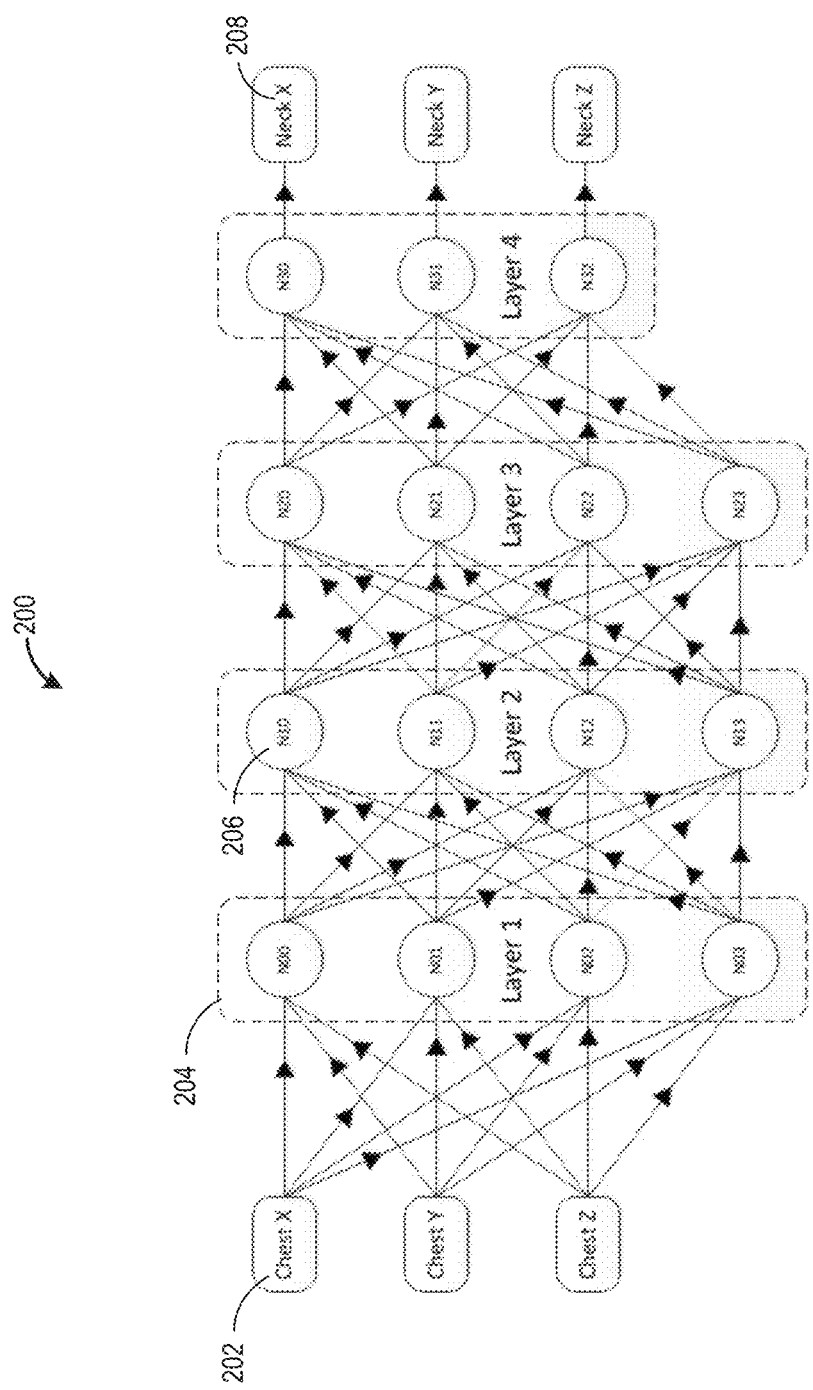
FIG. 7 illustrates an example embodiment of a neural network.

The IK system can generate a machine learning model that can procedurally generate outputs of joint positions based on defined inputs. In some embodiments, the machine learning or prediction model can be a deep neural network. FIG. 7 illustrates an example of a fully connected deep neural network ("DNN") 200. The illustrated DNN 200 has four hidden layers 204 with fifteen hidden nodes 206, three chest inputs 202, and results in three neck outputs 208. The illustrated embodiment provides output positions for three neck joints based on the input positions of three chest joints of the character model. The DNN can be generated using the machine learning process based on motion capture data. The nodes define the rules for how the movement of the joints respond or influence movement of other joints within the character model. For example, when the knee is bent in one way then the ankle will generally bend in a specific way. The character model data, motion capture data, and calculated data (such as, angle constraint data) can be used to generate the DNN. The DNN can be associated with a defined network of joints within the character model. As illustrated, the DNN 200 is associated with the chest and neck. Some components of a character model can be more difficult to model because of the freedom of motion associated with the joints and the interaction of the joints with other joints. For example, the spine, neck, and chest can be difficult joints to model in a realistic and lifelike manner.

The nodes 206 of the model 200 may generally include an activation function and define a set of weights and biases. Multiple DNNs can be generated based on the type of model and requirements of the system. Each DNN can be a fully connect neural network with a number of hidden layers which is specific to each system and each can have defined inputs joints that drive defined output joints. In some embodiments, an input for one DNN may be dependent on the output from another DNN. The resultant output of the DNN can be used to generate estimated poses which can then be used as guidelines during a preconditioning or predictive pose step and/or can directly affect the final pose. The DNN model generation process is described further with respect to FIGS. 8A and 8B.

In some embodiments, the system generate the activation function using a Leaky rectified quadratic unit (Leaky ReQU). Using the Leaky ReQU can result in smoother outputs of the machine learning model in comparison to using a Leaky rectified linear unit (ReLU) to generate the activation function. Leaky ReQU is an expansion of ReLU with a quadratic curve instead of a linear curve.

Example Model Generation System

Figure 8A:
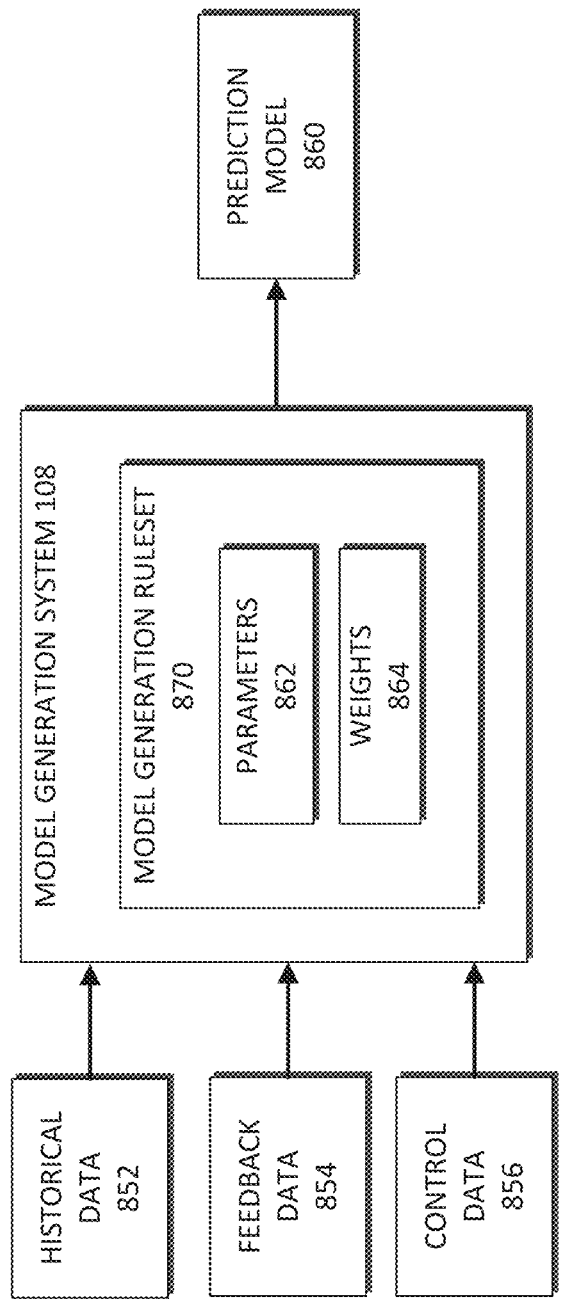
FIG. 8A illustrates an embodiment of a model generation system.

FIG. 8A illustrates an embodiment of a model generation system 108 of FIG. 1. The model generation system 108 may be used to determine one or more prediction models 860 based on historical data 852, such as motion capture data. For example the historical data 852 may include motion capture data for hundreds, or more, of a motion capture test session. Further, the historical data 852 can include data received from one or more data sources, such as, for example, one or more video games that share a game engine. In some cases, the historical data 852 may be associated with specific types of motion capture data. Further, in some embodiments, one or more subsets of the historical data are limited by the type of game application, such as for example, limited to include only motion capture data from the football games. The historical data may also be restricted to a particular period of time or include other types of restrictions.

The model generation system 108 may, in some cases, also receive feedback data 854. This data may be received as part of a supervised model generation process that enables a user, such as an administrator, to provide additional input to the model generation system 108 that may be used to facilitate generation of the prediction model 860. For example, if an anomaly exists in the historical data 852, the user may tag the anomalous data enabling the model generation system 108 to handle the tagged data differently, such as applying a different weight to the data or excluding the data from the model generation process.

Further, the model generation system 108 may receive control data 856. This control data 856 may identify one or more features or characteristics for which the model generation system 108 is to determine a model 860. Further, in some cases, the control data 856 may indicate a value for the one or more features identified in the control data 856.

The model generation system 108 may generally include a model generation rule set 870 for generation of the prediction model 860. In some embodiments, the prediction model generated can be a deep neural network, such as model 200 in FIG. 7. The rule set 870 may include one or more parameters 862. The parameters 862 can include one or more activation functions. The prediction model 860 can also include the weights and biases, which can be derived during the training process based on particular input data, such as the historical data 852, feedback data 854, and control data 856, and defined output criteria, which may be included with the control data 856, used for training purposes. The model generation rule set 870 can define the specific machine learning rules and/or algorithms the model generation system 108 uses to generate the model based on a defined objective function, such as determining a position of a joint based on the position of one or more other joints in a character model.

In some embodiments, initial parameters 862 and weights 864 can be manually provided during the initiation of the model generation process. The parameters 862 and weights 864 can be updated and modified during the model generation phase to generate the prediction model 860. In some embodiments, weights may be applied to the parameter functions or prediction models themselves. For example, the mathematical complexity or the number of parameters included in a particular prediction model 860 may affect a weight for the particular prediction model 860, which may impact the generation of the model and/or a selection algorithm or a selection probability that the particular prediction model 860 is selected.

The model generation system 108 can filter and categorize the historical data sets according to various characteristics and parameters of the data. The model generation system 108 can filter the information to identify the information for further processing. In some embodiments, the model generation system 108 is configured to filter and separate the historical data 852 into a plurality of data types or categories before further processing. Moreover, in some cases, some of the historical data 852 may be filtered out or removed from the historical data 852 based on the data being associated with a relevance that does not satisfy a threshold relevance as determined by the model generation system 108.

After the prediction model 860 has been generated, the model can be used during runtime to generate a pose of the character model within the video game 120. For example, the prediction model can be a DNN 200 such as illustrated in FIG. 7, and can be used during generation of a pose for the character model during runtime of the game application.

Example Prediction Model Generation Process

Figure 8B:
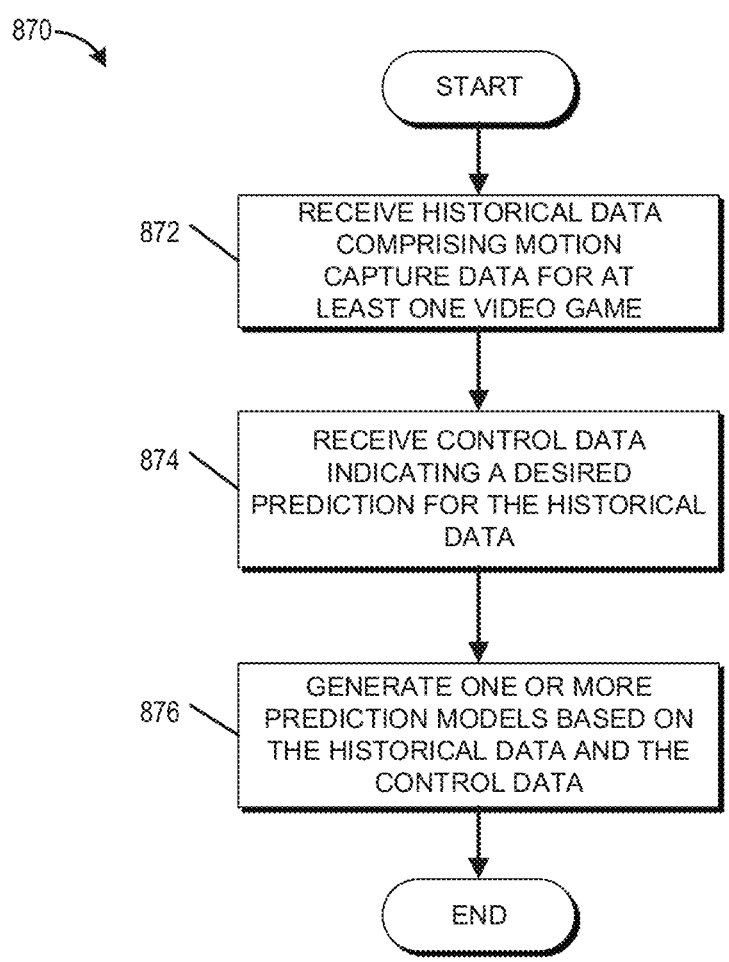
FIG. 8B illustrates a flowchart of an embodiment of a prediction model generation process.

FIG. 8B presents a flowchart of an embodiment of a prediction model generation process. The process 870 can be implemented by any system that can generate one or more parameter functions or prediction models that include one or more parameters. In some cases, the process 870 serves as a training process for developing one or more parameter functions or prediction models based on historical data or other known data. The process 870, in whole or in part, can be implemented by, for example, an interactive computing system 102, a model generation system 108, or a user computing system 110, among others. Although any number of systems, in whole or in part, can implement the process 870, to simplify discussion, the process 870 will be described with respect to particular systems. Further, it should be understood that the process 870 may be updated or performed repeatedly over time. For example, the process 870 may be repeated each time additional motion capture data is acquired, after a defined period of time, or based on other criteria.

The process 870 begins at block 872 where the model generation system 108 receives historical data 852 comprising motion capture data associated with one or more video games. The historical data 852 may comprise data for video games that were developed using the same game engine. This historical data 852 may serve as training data for the model generation system 108. Further, the historical data 852 may include video game state information for previously tested video games or iterations of a video game.

At block 874, the model generation system 108 receives control data 856 indicating a desired prediction criteria corresponding to the historical data 852. This control data 856 may indicate one or more features or characteristics for which the model generation system 108 is to determine a model. Alternatively, or in addition, the control data 856 may include a value for the features or characteristics that are associated with the received historical data 852. For example, the control data 856 may motion capture data that is important to the specific joints of a character model. In some embodiments, the control data 156 may include specific actions from the motion capture data that are associated with actions within the game application.

At block 876, the model generation system 108 generates one or more prediction models 860 based on the historical data 852 and the control data 856. The prediction models 860 may include one or more variables or parameters 862 that can be combined using a mathematical algorithm or model generation ruleset 870 to generate a prediction model 860 based on the historical data 852 and, in some cases, the control data 856. Further, in certain embodiments, the block 876 may include applying one or more items of feedback data 854. For example, if the prediction model 860 is generated as part of a supervised machine learning process, a user (for example, an administrator) may provide one or more inputs to the model generation system 108 as the prediction model 860 is being generated to refine the prediction model 860 generation process.

Example Embodiments of a Pose Generation Process

Figure 9A:
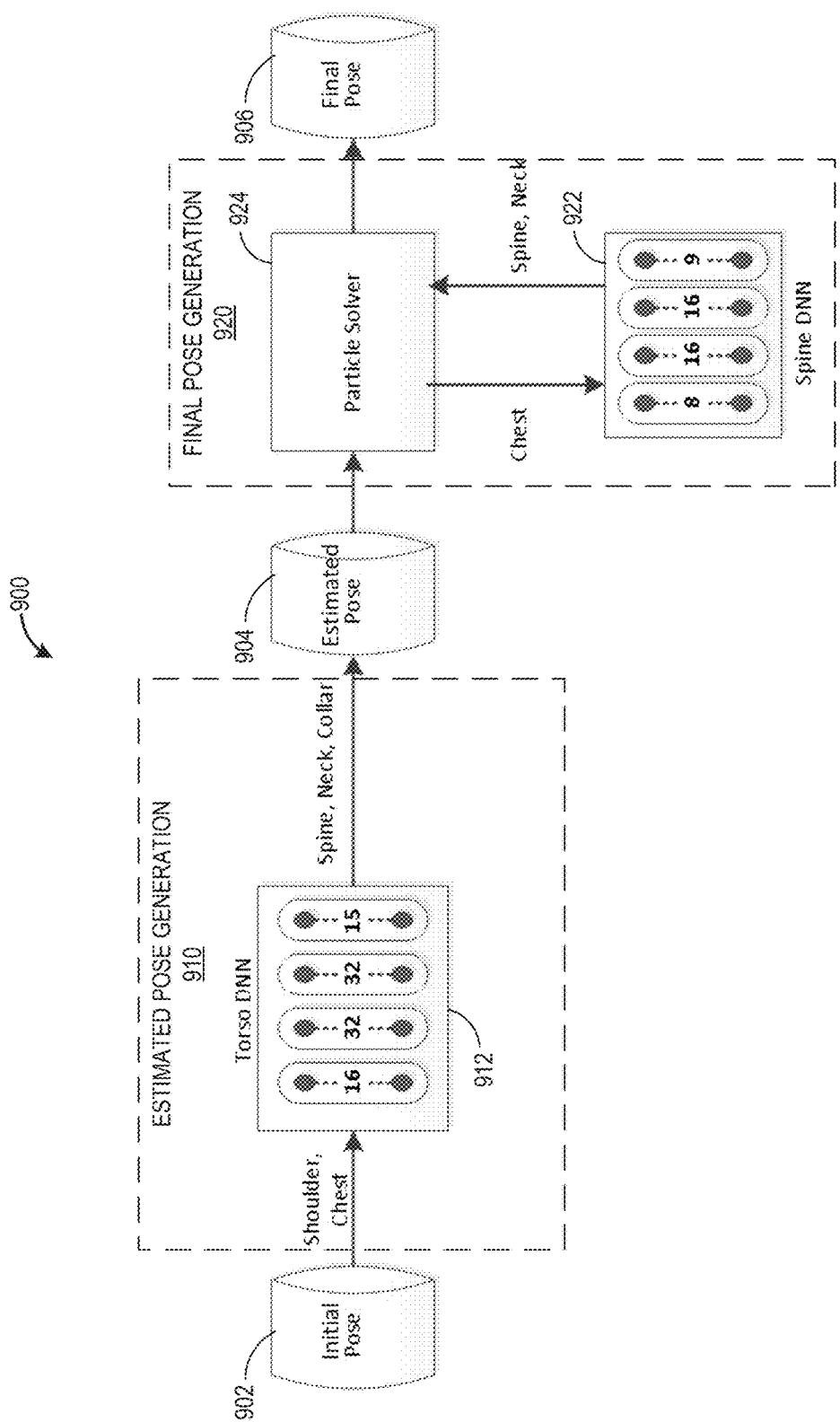
FIGS. 9A and 9B illustrate example embodiments of a component workflow for generating a pose for a character model.
Figure 9B:
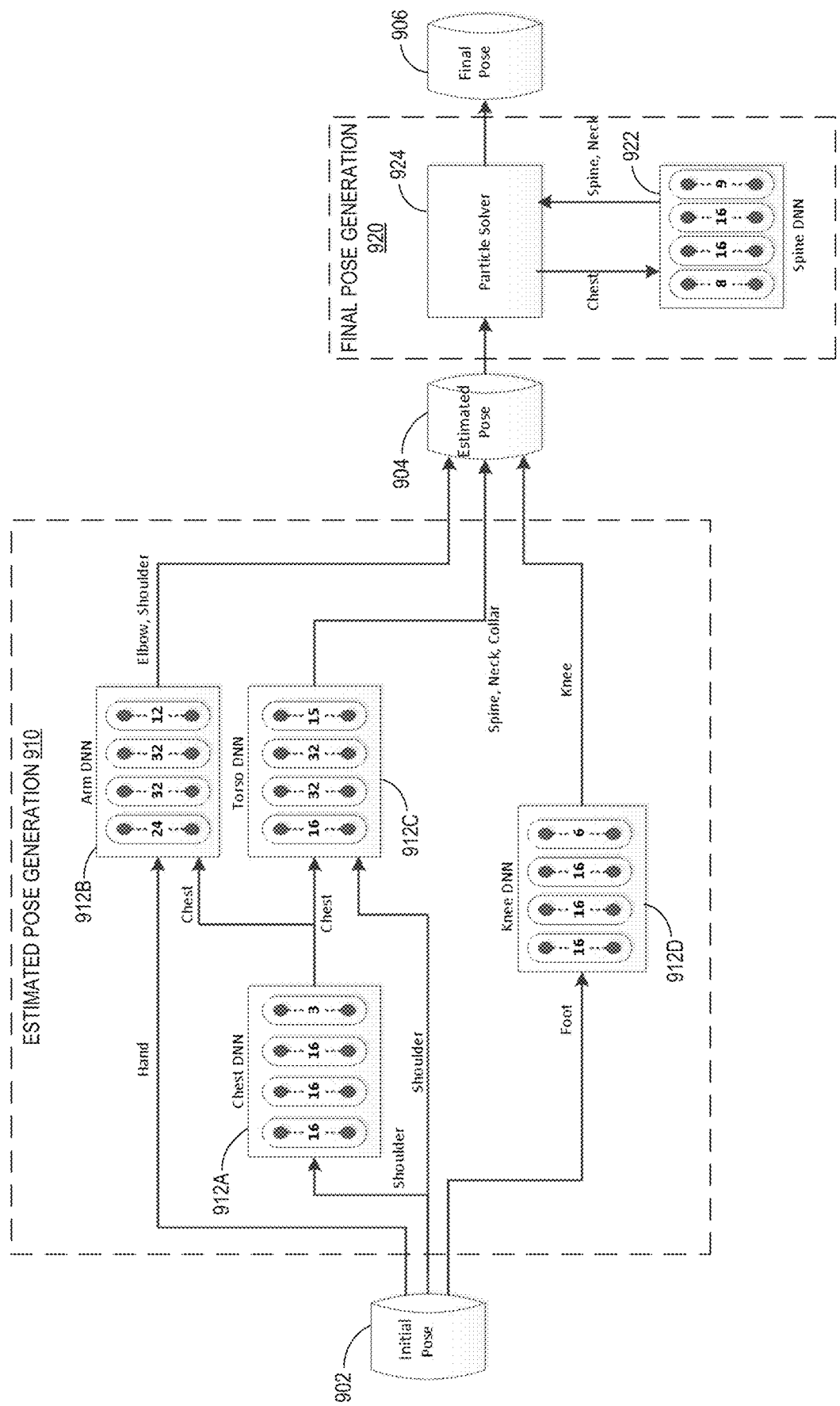

FIGS. 9A and 9B illustrate example embodiment of a pose generation workflow process 900 for generating a pose for a character model during runtime execution of a game application. The workflow 900, in whole or in part, can be implemented by, for example, by one or more systems, such as, for example, by the character movement engine 125, the game engine 124, the game application 120, the user computing system 110, the interactive computing system 102, among others. The pose generation workflow provides a procedural function that can be used to create a life-like and realistic poses for the character models during runtime execution of a game application.

The pose generation workflow in includes two pose generation phases: (i) an estimated pose generation phase 910, also referred to as a predictive pose or a preconditioning pose generation phase; and (ii) a final pose generation phase, also referred to as an updated pose phase. Each phase can utilize one or more prediction models, such as deep neural networks.

An initial pose 902 can be provided for generation of the estimated pose during the estimated pose generation phase 910. In some embodiments, the initial pose 902 can be produced by the game engine, for instance it can be a new frame of a motion-captured clip, or a blend of various clips that have been selected in response to the user or AI inputs so that the character performs the desired action. Generally, the animation system can generate the initial pose 902 using forward kinematics. When the animation system is not capable of reaching certain objectives, such as making precise contact with an object, the inverse kinematics system can take the initial pose and modify it according to the desired requirements to produce the final pose.

For example, a user may issue a command for a goalkeeper to block a ball shot on goal. The animation system, using forward kinematics, can attempt to produce an initial pose that places the hand as close as possible to the ball's trajectory. The end-effector can be a goalkeeper hand that is moved to intercept or deflect the ball. The game engine will then reposition the goalkeeper's hand effector so that it precisely intercepts or deflects the ball. Inverse kinematics can be used to update the initial pose to intercept or deflect the ball independent of the character animation. Inverse kinematics can then be used to update the initial pose and solve the pose of the arm and possibly the whole body so that the hand reaches exactly the desired position. The pose generation workflow 900 can generate the final model pose based on the position of the end-effector using an inverse kinematic procedure.

During the estimated pose generation phase 910, an estimated pose 904 can be generated based at least in part on the prediction model 912. The estimated pose 904 can be used to determine a predicted location for the elements of the character model. The approximation of the location can help to reduce the number of iterations necessary for the particle solver 924 to determine the final pose. In some embodiments it can reduce the number of iterations necessary to generate a final pose by approximately two-thirds. The step can be referred to as a preconditioning step prior to generation of the final pose 906. One or more predictive solvers can be used to generate predicted locations of elements of the character model. The DNN 912 can generate the predicted locations for at least a portion of the elements of the model, which can represent more realistic poses for the character model. This can be helpful for generating poses for difficult portions of a character model. The DNN 912 can be used to generate at least a portion of character model for the predictive pose. A number of the rules and constraints associated with elements of the character model can be calculated without using a DNN. Each joint locations may be determined in accordance with one or more rules and/or constraints by one or more predictive solvers. For example, the knee joint is not a highly flexible joint, it has a limited bending angle and axis are limited. However, certain defined DNNs can be used in order for more complex portions of the character model.

For example, FIG. 9A illustrates a DNN 912 associated with the torso of the character model that uses shoulder and chest joint positions in order to generate joint positions for the spine, neck, and collar. The nodes within the DNN can generate the output joint positions by applying the parameters, constraints, and weights determined during the model generation process to the received input data (such as, the shoulder and chest joint positions). The output joint positions of the spine, neck, and collar joints can be generated relative to the positions of the shoulder and chest.

FIG. 9B illustrates another embodiment of the pose generation workflow 900. In FIG. 9B, the predictive pose generation phase 910 includes four separate DNNs, a chest DNN 912A, an arm DNN 912B, a torso DNN 912C, and a knee DNN 912D. As illustrated, the output for a DNN can be at least one of the inputs for another DNN. For example, the chest DNN 912A outputs at least a portion of the chest joint location data to torso DNN 912B and the arm DNN 912C. Depending on the specific architecture and configuration of the pose generation workflow, any number of DNNs can be used in order to generate the predictive pose during the predictive pose generation phase 910.

The estimated pose generation phase completes after generation of the estimated pose 904. In some embodiments, the estimated pose generation phase 910 can be iterative and can iterate multiple times prior to completion.

During the final pose generation phase 920, the estimated pose 904 is provided to particle solver 924. The particle solver 924 can iteratively generate a final pose for outputting to the rendering system. During the final pose generation phase 920, the particle solver 924 can interact with the DNN 922 in order to generate a pose that satisfies the constraints associated with the respective elements of the character model. The iterative calculations performed by the particle solver can be done in accordance with one or more DNNs, which can help to smooth out the animation so that it becomes more realistic.

For example, in the illustrated embodiment, the DNN 922 is associated with the spine. The DNN 922 receives inputs associated with the locations of joints of the chest and outputs locations of joints associated with the spine and neck of the character model. The Spine DNN 922 can provide higher order filtering or smoothing of the iterative process to ensure that the iterations performed by the particle solver are done in accordance with the constraints associated with the defined portion of the character model. The DNN 922 can enforce an additional constraint at every step of the iteration. For instance, during the iteration the chest may be moved to satisfy a requirement, the DNN 922 can be used to obtain the corresponding effect on the spine and neck. This in turn will reposition the shoulders and arms. The resulting pose is then evaluated in relation to the inverse kinematic requirement (for example, that the hand is in a given position, as specified by the hand effector). If the pose doesn't hit the requirement within the desired accuracy thresholds, then another iteration will be needed to try to reduce the error. For instance, the hips will be moved in the opposite direction by a given amount, which will move the chest again, calling for another evaluation of DNN 922 to obtain the updated spine and neck positions. This iterative process continues until the desired requirements are obtained, or until a maximum number of iterations is reached. The final pose generation phase 920 is completed when the final pose 906 is generated. The final pose can be provided for further rendering of the character model within the game application.

Figure 10:
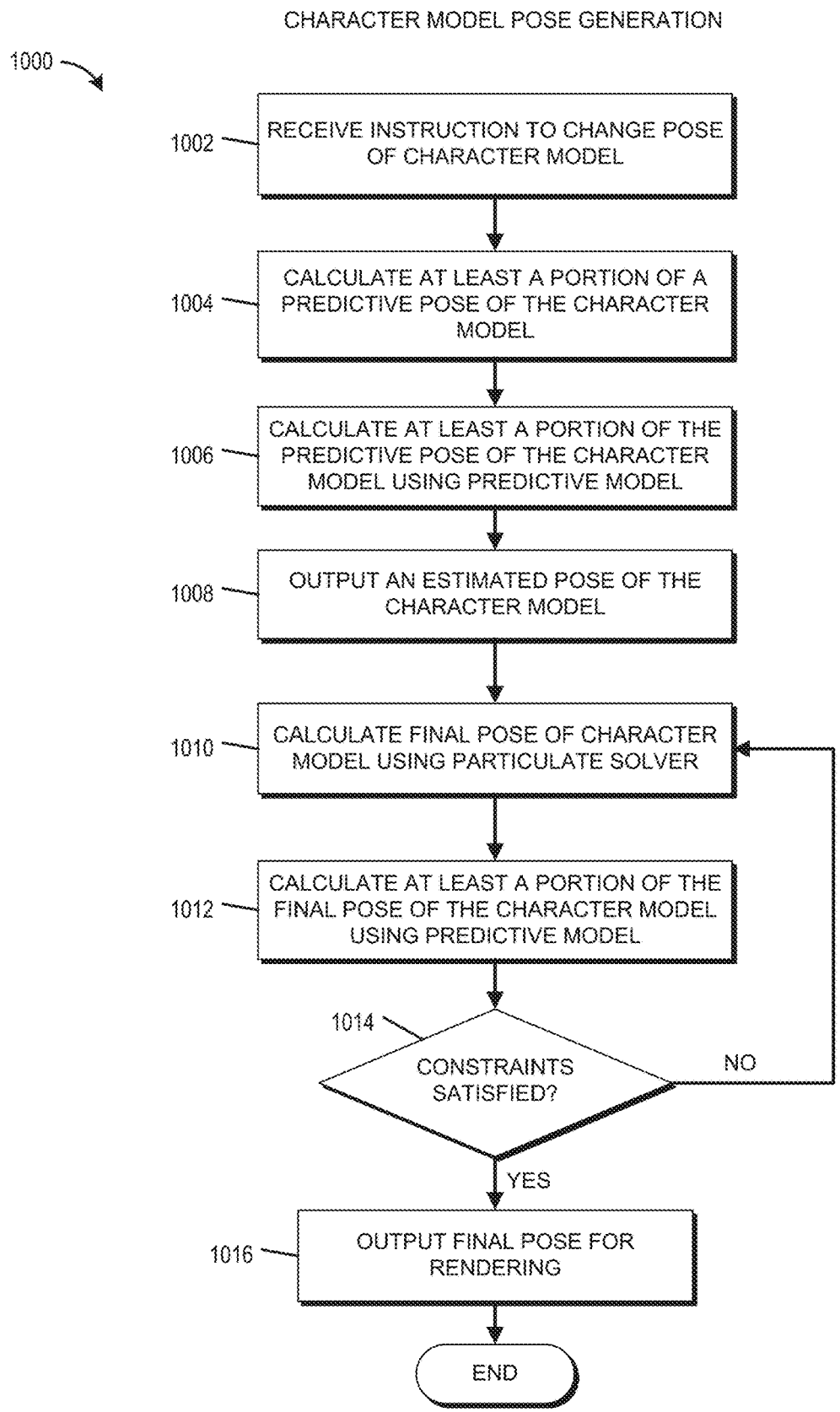
FIG. 10 illustrates an example embodiment of a process for generating a pose for a character model.

FIG. 10 presents a flowchart of an embodiment of a process 1000 for generating a pose for a virtual character model during runtime of a game application. The process 1000 can be implemented by any system that execute and render a video game application. The process 1000, in whole or in part, can be implemented by, for example, by one or more systems, such as, for example, by the character movement engine 125, the game engine 124, the game application 120, the user computing system 110, the interactive computing system 102, among others. Although any number of systems, in whole or in part, can implement the process 1000, to simplify discussion the process 1000 will be described with respect to particular systems. Further, the process 1000, or particular operations of the process 1000 may be performed continuously or repeatedly during runtime for a video game 120 until a condition is reached or a user stops execution of the game application. For example, the process 1000 may be configured to repeat for each character model being rendered within the game application. In some embodiments, the process may be utilized for only a subset of the characters being rendered by the game application.

At block 1002 the system can receive instructions to change the pose of a character model. The change of pose to the character model can be a change of position of at least one of the joints of the character model. The change can be based on the events occurring within the game application. The change to the pose can be based on the movement of an end-effector of the character model to a new position.

At block 1004, the system can calculate an estimated pose for at least a portion of the elements of a character model. The system can calculate the position of elements of the character model using an inverse kinematic analysis. The calculated positions of the elements of the character model can be based at least in part on one or more constraints and or rules associated with the individual elements of the character model.

At block 1006, the system can calculate an estimated pose for at least a portion of the elements of a character model using a prediction model. In some embodiments, the prediction model can be a deep neural network, such as illustrated in FIG. 7. The inputs to the prediction model can be locations associated with one or more elements of the character model. The outputs of the prediction model can be one or more elements of the character model that are different that the locations of the input elements of the character model. The prediction model can output locations of elements based on defined rules and constraints of the model. The output elements can be elements that are associated with the input elements.

At block 1008, the system can output the predictive pose for the character model based at least in part on the predictive pose elements generated by the machine learning model and the predictive solvers. The prediction model can be configured to provide an approximation of the final positions of the elements of the character models based on movement of the end-effector of the character model.

At block 1010, the system can use the predictive pose to calculate a final pose of the character model with the particulate solver. The particulate solver can be configured to modify the positions of the elements of the predictive pose in order to determine a final pose that satisfies the constraints of the character model based on the new position of the end-effector element. The particulate solver can be configured to iteratively modify the positions of the elements of the model in order to determine a solution. For each iteration, the particulate solver can provide the iterated pose to a prediction model associated with at least a portion of the elements of the character model.

At block 1012, the prediction model can calculate locations of at least a portion of the elements of the character model. The machine learning model can be used to verify that the proposed final pose provided by the particulate solver satisfies the constraints of at least a portion of the elements of the model that are associated with the prediction model. In some embodiments, a plurality of machine learning models are used verify the constraints of the pose generated by the particulate solver.

At decision block 1014, the system can determine whether the constraints have been satisfied for the final pose of the model. If the constraints have not been satisfied, the process returns to block 1010 and the particulate solver performs another iteration. If the constraints have been satisfied, the system proceeds to block 1016.

At block 1016, the system outputs the final pose for rendering and output within the game application. The process 1000 can be performed multiple times for each rendered frame within the game application.

Example Embodiment of a Dynamic Effector Process

Figure 11:
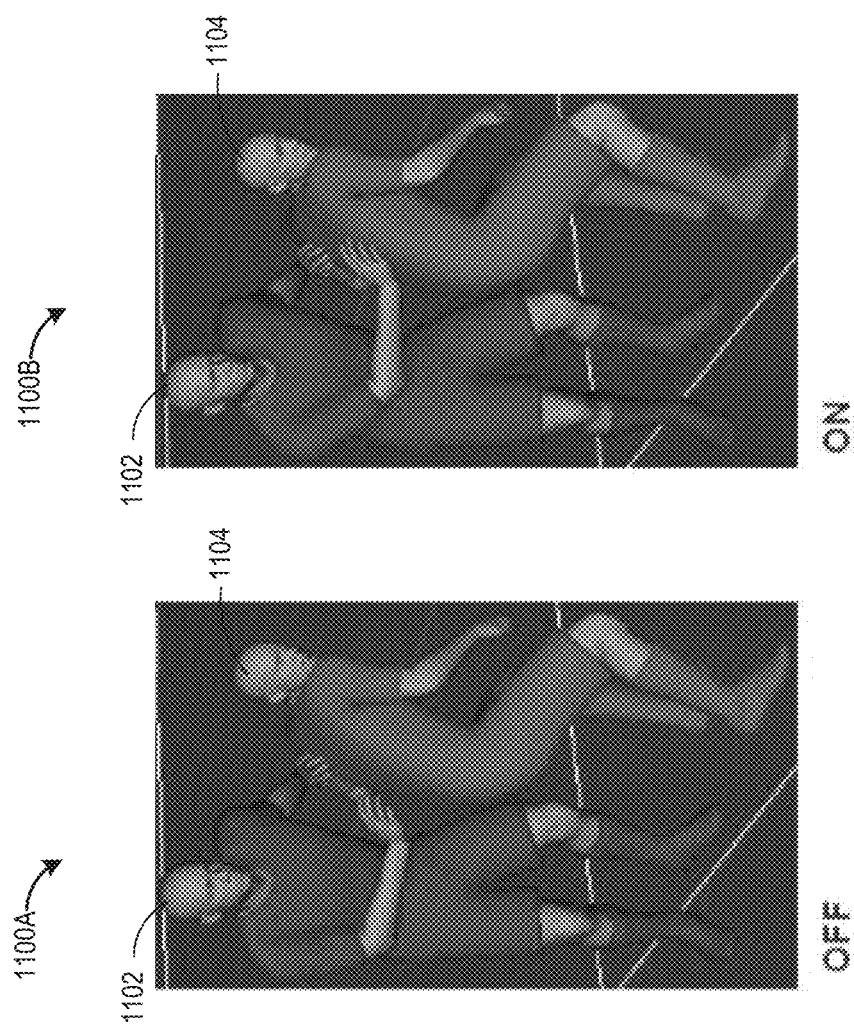
FIG. 11 illustrates an example embodiment illustrating aspects of a dynamic effector process.

FIG. 11 illustrates an example embodiment illustrating aspects of a dynamic effector process for a character model. An attached effector can be an element of a character model, such as the right hand of character 1102, that is positioned with respect to a separate element within the game application, such as the back of character model 1104. The system can dynamically adjust the position of the effector based on the position of the other element within the application. Dynamic effectors can change position every frame. Due to the use of heuristics and speculations, previous solvers could generate deformed poses that could appear unnatural or robotic when the target effector was moved every frame. Dynamic effectors that utilize DNN can follow a moving target much more naturally.

In the illustrated example, a collision can occur between two characters within the game and the left hand of character 1102 can be positioned relative to an estimated location of the back of character 1104. In the FIG. 1100A, the hand (effector) is offset from the back because it is using a static offset for the location of the hand based on an estimated location of the back. In FIG. 1100B the system can use the DNN to dynamically adjust the hand position of the character 1102 so that it follows an effector placed on the back of character 1104. As illustrated the hand of player 1102 is positioned correctly on the back of the player 1104. The prediction models are used inside the inverse kinematic solver in order to modify the entire body pose so that the hand can reach the desired target in every frame.

Overview of Computing Device

Figure 12:
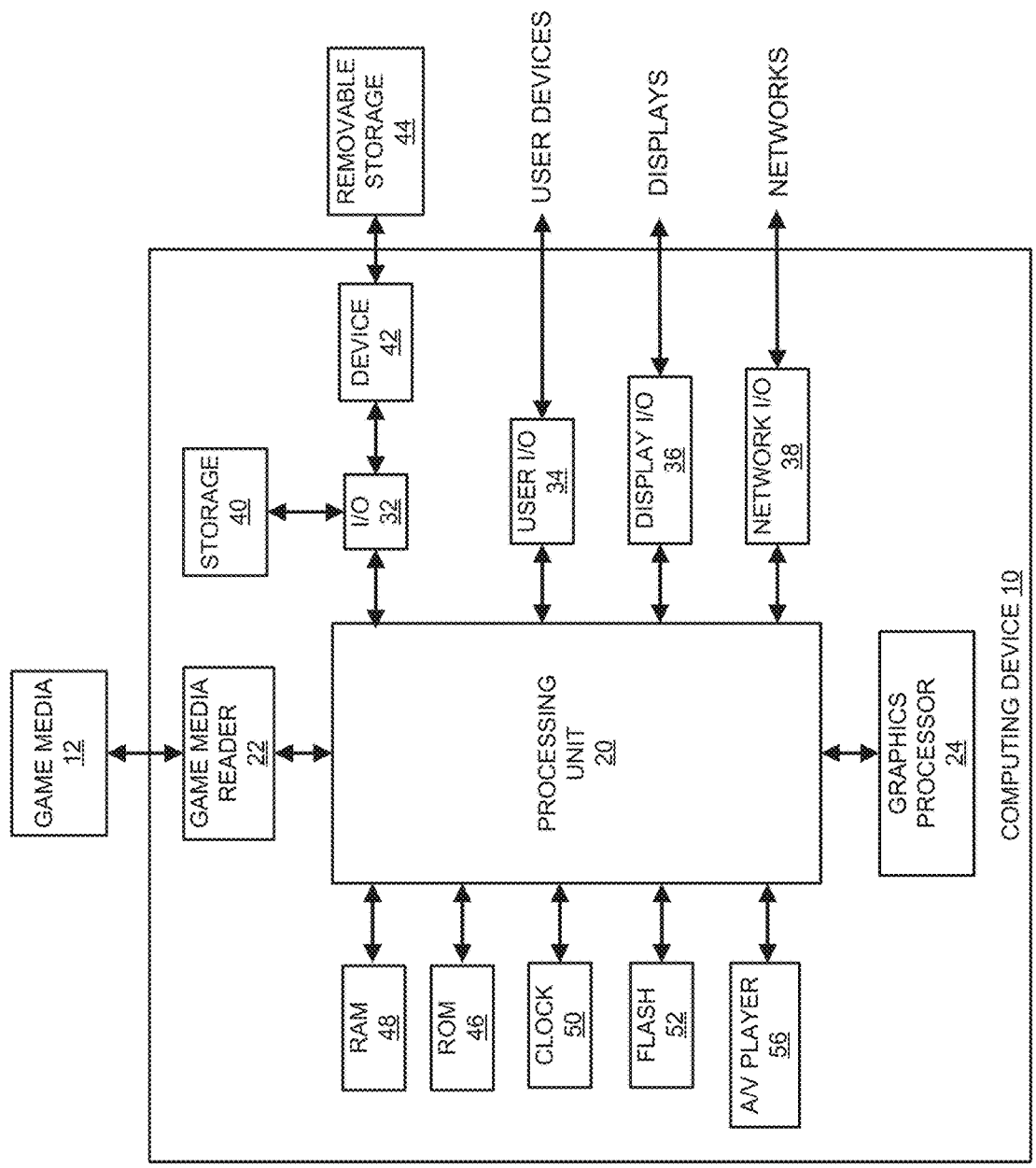
FIG. 12 illustrates an example embodiment of a user computing system.

FIG. 12 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. The computing device 10 may also be distributed across multiple geographical locations. For example, the computing device 10 may be a cluster of cloud-based servers.

As shown, the computing device 10 includes a processing unit 20 that interacts with other components of the computing device 10 and also external components to computing device 10. A game media reader 22 is included that communicates with game media 12. The game media reader 22 may be an optical disc reader capable of reading optical discs, such as CD-ROMs or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively or additionally, the computing device 10 may include a discrete graphics processor 24 that is separate from the processing unit 20. In some such cases, the graphics processor 24 may have separate RAM from the processing unit 20. Computing device 10 might be a handheld game application device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a video game is being played.

User I/O 34 is used to send and receive commands between processing unit 20 and user devices, such as game controllers. In some embodiments, the user I/O 34 can include a touchscreen input. The touchscreen can be capacitive touchscreen, a resistive touchscreen, or other type of touchscreen technology that is configured to receive user input through tactile inputs from the player. Display I/O 36 provides input/output functions that are used to display images from the game being played. Network I/O 38 is used for input/output functions for a network. Network I/O 38 may be used during execution of a game, such as when a game is being played online or being accessed online, application of fraud detection, and/or generation of a fraud detection model.

Display output signals produced by display I/O 36 comprise signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10.

The computing device 10 can also include other features that may be used with a video game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise a hard disk, other magnetic storage, optical storage, other non-volatile storage or a combination or variation of these). Part of the program code can be stored in ROM that is programmable (ROM, PROM, EPROM, EEPROM, and so forth), and part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM 48 is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads game media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
   at least one data store comprising game application data and a plurality of prediction models associated with one or more virtual character models; and
   a computing device in electronic communication with the data store and configured to execute a game application based in part on the game application data, the game application configured to:
   generate a virtual game environment;
   determine a first pose of a first virtual character model within the virtual game environment, the first virtual character model comprising a plurality of rigid bodies connected by a plurality of joints, each joint connected to at least one rigid body, wherein the first pose of the first virtual character model is a first arrangement of the plurality of rigid bodies and the plurality of joints of the first virtual character model;
   render at least a portion of the first pose of the first virtual character model within a frame during runtime of the game application;
   receive an instruction to change the first pose of the first virtual character model in response to a first movement of at least one joint of the first virtual character model during runtime of the game application;
   determine a second pose for the first virtual character model by:
   calculating an estimated pose of the first virtual character model based at least in part on a first prediction model of the plurality of prediction models wherein the estimated pose is not output for rendering during runtime of the game application; and
   using the estimated pose as an input to a second prediction model of the plurality of prediction models;
   calculating the second pose of the first virtual character model based, at least in part, on an output of the second prediction model of the plurality of prediction models, wherein the estimated pose and the second pose are calculated in response to the first movement of the at least one joint of the first virtual character model, wherein the estimated pose is a pose distinct from the first post and the second pose; and
   render at least a portion of the second pose of the first virtual character model within a frame during runtime of the game application.

2. The system of claim 1, wherein the estimated pose and the second pose are calculated using inverse kinematic analysis.

3. The system of claim 1, wherein each joint of the first virtual character model is associated with a defined set of constraints and rules governing movement of an associated joint of the first virtual character model within the virtual game environment.

4. The system of claim 1, wherein the first prediction model is associated with at least a first subset of the plurality of joints of the first virtual character model and the second prediction model is associated with at least a second subset of the plurality of joints of the first virtual character model.

5. The system of claim 4, wherein the game application is further configured to determine a position of each of the plurality of joints not included in the first subset based at least in part on a defined set of constraints and rules associated with each of the plurality of joints.

6. The system of claim 4, wherein the first subset of the plurality of joints and the second subset of the plurality of joints are the same.

7. The system of claim 1, wherein the first prediction model receives as an input at least a position of at least a first joint of the plurality of joints of the first virtual character model and outputs at least one position of a second joint of the plurality of joints.

8. The system of claim 1, wherein each prediction model of the plurality of prediction models is associated with a different subset of joints of the first virtual character model.

9. The system of claim 1, wherein the plurality of prediction models are machine learning models.

10. The system of claim 1, wherein the first prediction model and the second prediction model are fully connected neural network models.

11. A computer-implemented method comprising:
as implemented by a user computing device configured with specific computer-executable instructions for executing a game application,
generating a virtual game environment;
determining a first pose of a first virtual character model within the virtual game environment, the first virtual character model comprising a plurality of rigid bodies connected by a plurality of joints, each joint connected to at least one rigid body, wherein the first pose of the first virtual character model is a first arrangement of the plurality of rigid bodies and the plurality of joints of the first virtual character model;
rendering at least a portion of the first pose of the first virtual character model within a frame during runtime of the game application;
receiving an instruction to change the first pose of the first virtual character model in response to a first movement of at least one joint of the first virtual character model;
determining a second pose for the first virtual character model by:
calculating an estimated pose of the first virtual character model based at least in part on a first prediction model of the plurality of prediction models wherein the estimated pose is not output for rendering during runtime of the game application; and
using the estimated pose as an input to a second prediction model of the plurality of prediction models;
calculating the second pose of the first virtual character model based, at least in part, on an output of the second prediction model of the plurality of prediction models, wherein the estimated pose and the second pose are calculated in response to the first movement of the at least one joint of the first virtual character model, wherein the estimated pose is a pose distinct from the first post and the second pose; and
rendering at least a portion of the second pose of the first virtual character model within a frame during runtime of the game application.

12. The method of claim 11, wherein each joint of the first virtual character model is associated with a defined set of constraints and rules governing movement of an associated joint of the first virtual character model within the virtual game environment.

13. The method of claim 12 further comprising determining a position of a subset of the plurality of joints based at least in part on the defined set of constraints and rules associated with each of the joints.

14. The method of claim 12 further comprising iteratively calculating the second pose using the second prediction model until a defined set of constraints are satisfied.

15. The method of claim 11, wherein the first prediction model receives as an input at least a position of at least a first joint of the plurality of joints and outputs at least one position of a second joint of the plurality of joints.

16. The method of claim 11, wherein the first prediction model is one of a plurality of prediction models used to generate the estimated pose, wherein each of the plurality of prediction models are associated with a different subset of joints of the plurality of joints.

17. The method of claim 11, wherein the first prediction model is associated with at least a first subset of the plurality of joints of the first virtual character model and the second prediction model is associated with at least a second subset of the plurality of joints of the first virtual character model.

18. A non-transitory computer-readable storage medium having stored thereon computer-executable instructions that, when executed, direct a computing system to perform a method comprising:
executing a game application;
generating a virtual game environment;
determining a first pose of a first virtual character model within the virtual game environment, the first virtual character model comprising a plurality of rigid bodies connected by a plurality of joints, each joint connected to at least one rigid body, wherein the first pose of the first virtual character model is a first arrangement of the plurality of rigid bodies and the plurality of joints of the first virtual character model;
rendering at least a portion of the first pose of the first virtual character model within a frame during runtime of the game application;
receiving an instruction to change the first pose of the first virtual character model in response to a first movement of at least one joint of the first virtual character model;
determining a second pose for the first virtual character model by:
calculating an estimated pose of the first virtual character model based at least in part on a first prediction model of the plurality of prediction models, wherein the estimated pose is not output for rendering during runtime of the game application; and
using the estimated pose as an input to a second prediction model of the plurality of prediction models;
calculating the second pose of the first virtual character model based, at least in part, on an output of the second prediction model of the plurality of prediction models, wherein the estimated pose and the second pose are calculated in response to the first movement of the at least one joint of the first virtual character model, wherein the estimated pose is a pose distinct from the first post and the second pose;
rendering at least a portion of the second pose of the first virtual character model within a frame during runtime of the game application.

19. The non-transitory computer-readable storage medium of claim 18, wherein the computer-executable instructions further configure the computing system to perform determining a position of a subset of the plurality of joints based at least in part on a defined set of constraints and rules associated with each of the joints.

20. The non-transitory computer-readable storage medium of claim 18, wherein the computer-executable instructions further configure the computing system to perform iteratively calculating the second pose using the second prediction model until a defined set of constraints are satisfied.

* * * * *